(12) United States Patent
Chen et al.

(10) Patent No.: US 11,194,941 B2
(45) Date of Patent: *Dec. 7, 2021

(54) LATTICE BOLTZMANN COLLISION OPERATORS ENFORCING ISOTROPY AND GALILEAN INVARIANCE

(71) Applicant: Dassault Systemes Simulia Corp., Johnston, RI (US)

(72) Inventors: Hudong Chen, Newton, MA (US); Raoyang Zhang, Burlington, MA (US); Pradeep Gopalakrishnan, Woburn, MA (US)

(73) Assignee: Dassault Systemes Simulia Corp., Johnston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/580,059

(22) Filed: Sep. 24, 2019

(65) Prior Publication Data

US 2020/0019662 A1    Jan. 16, 2020

Related U.S. Application Data

(63) Continuation of application No. 15/402,732, filed on Jan. 10, 2017, now Pat. No. 10,867,088, which is a
(Continued)

(51) Int. Cl.
*G06F 30/23* (2020.01)
*G06F 30/20* (2020.01)
(Continued)

(52) U.S. Cl.
CPC .............. *G06F 30/23* (2020.01); *G06F 17/11* (2013.01); *G06F 17/18* (2013.01); *G06F 30/20* (2020.01); *G06F 2111/10* (2020.01)

(58) Field of Classification Search
USPC ............................................................ 703/2
See application file for complete search history.

(56) References Cited

U.S. PATENT DOCUMENTS 5,377,129 A * 12/1994 Molvig ................. G06F 15/803
703/9
5,548,694 A * 8/1996 Frisken Gibson ...... G06T 15/10
345/424

(Continued)

OTHER PUBLICATIONS

Geier et al. ("Cascaded digital lattice Boltzmann automata for high Reynolds number flow", The American Physical Society, 2006, pp. 1-10) (Year: 2006).*

(Continued)

*Primary Examiner* — Iftekhar A Khan
(74) *Attorney, Agent, or Firm* — Fish & Richardson P.C.

(57) ABSTRACT

A method comprising: simulating, in a lattice velocity set, movement of particles in a volume of fluid, with the movement causing collision among the particles; based on the simulated movement, determining relative particle velocity of a particle at a particular location within the volume, with the relative particle velocity being a difference between (i) an absolute velocity of the particle at the particular location within the volume and measured under zero flow of the volume, and (ii) a mean velocity of one or more of the particles at the particular location within the volume; and determining, based on the relative particle velocity, a non-equilibrium post-collide distribution function of a specified order that is representative of the collision.

20 Claims, 8 Drawing Sheets

Related U.S. Application Data continuation of application No. 14/829,933, filed on Aug. 19, 2015, now Pat. No. 9,576,087, which is a continuation of application No. PCT/US2014/048004, filed on Jul. 24, 2014.

(60) Provisional application No. 61/858,051, filed on Jul. 24, 2013.

(51) Int. Cl.
*G06F 17/11* (2006.01)
*G06F 17/18* (2006.01)
*G06F 111/10* (2020.01)

(56) References Cited

U.S. PATENT DOCUMENTS

| | | | | |
|---|---|---|---|---|
| 5,594,671 | A * | 1/1997 | Chen | G06F 15/803 703/6 |
| 5,606,517 | A * | 2/1997 | Traub | G06F 30/23 703/9 |
| 5,640,335 | A * | 6/1997 | Molvig | G06F 30/23 703/9 |
| 5,848,260 | A * | 12/1998 | Chen | G06T 15/40 703/5 |
| 5,910,902 | A * | 6/1999 | Molvig | G06F 30/23 703/6 |
| 5,953,239 | A * | 9/1999 | Teixeira | G06F 30/23 703/6 |
| 6,089,744 | A * | 7/2000 | Chen | G06F 30/23 703/2 |
| 6,915,245 | B1 * | 7/2005 | Hinton | G06F 30/20 703/2 |
| 7,277,795 | B2 * | 10/2007 | Boitnott | G01V 11/00 702/6 |
| 7,558,714 | B2 * | 7/2009 | Shan | G06F 30/28 703/9 |
| 7,920,996 | B2 * | 4/2011 | Harada | G06F 16/283 703/2 |
| 8,099,265 | B2 * | 1/2012 | Houston | G06T 17/00 703/9 |
| 8,224,633 | B2 * | 7/2012 | Shan | G06F 30/17 703/9 |
| 8,296,112 | B2 * | 10/2012 | Tanaka | G06F 30/23 703/9 |
| 8,452,576 | B2 * | 5/2013 | Reich | G06F 30/20 703/5 |
| 8,688,414 | B2 * | 4/2014 | Bornoff | G01F 9/00 703/2 |
| 8,775,139 | B2 * | 7/2014 | Shim | G06F 30/23 703/9 |
| 8,775,140 | B2 * | 7/2014 | Yu | G06F 17/13 703/9 |
| 8,970,592 | B1 * | 3/2015 | Petterson | G06T 13/60 345/427 |
| 10,360,324 | B2 * | 7/2019 | Chen | G06F 30/23 |
| 2003/0060988 | A1 * | 3/2003 | Ginzburg | G06F 30/23 702/50 |
| 2008/0126045 | A1 * | 5/2008 | Shan | G06F 30/28 703/9 |
| 2010/0030534 | A1 * | 2/2010 | Reich | G06F 30/20 703/2 |
| 2010/0185420 | A1 * | 7/2010 | Ding | G06F 30/23 703/2 |
| 2010/0300942 | A1 * | 12/2010 | Sulchek | B07B 13/003 209/132 |
| 2011/0238394 | A1 * | 9/2011 | Shin | G06F 30/20 703/9 |
| 2011/0307837 | A1 * | 12/2011 | Cohen | G06F 3/04815 715/851 |
| 2012/0265511 | A1 * | 10/2012 | Shan | G06F 30/17 703/9 |
| 2012/0296615 | A1 * | 11/2012 | Shim | G06F 30/20 703/9 |
| 2013/0116997 | A1 * | 5/2013 | Sun | G06F 30/20 703/9 |
| 2013/0151221 | A1 * | 6/2013 | Chen | G06F 30/23 703/9 |
| 2014/0136159 | A1 * | 5/2014 | Chen | G06F 17/11 703/2 |
| 2014/0343858 | A1 * | 11/2014 | Crouse | G01V 99/005 702/13 |
| 2015/0356217 | A1 | 12/2015 | Chen et al. | |

OTHER PUBLICATIONS

Guo et al. ("Discrete lattice effects on the forcing term in the lattice Boltzmann method", The American Physical Society, 2002, pp. 1-5) (Year: 2002).*

Bao et al. ("Lattice Boltzmann Method for Fluid Simulations", 2011, pp. 1-16) (Year: 2011).*

Inamuro et al. ("A Galilean invariant model of the lattice Boltzmann method for multiphase fluid flows using free-energy approach", Computer Physics Communications 129 (2000) 32-45) (Year: 2000).*

Nie et al. ("Galilean invariance of lattice Boltzmann models", Computer Physics Communications EPLA, 81 (2008), pp. 1-6) (Year: 2008).*

Larina et al., "Non-linear Non-equilibrium Kinetic Model of the Boltzmann Equation for Monotonic Gases." Computational Mathematics and Mathematical Physics, 2011, vol. 51, No. 11,pp. 1962-1972 (2011).

Authorized officer Lee W. Young, International Search Report/ Written Opinion in PCT/US2014/048004 dated Oct. 27, 2014, 14 pages.

Parmigiani; "Lattice Boltzmann calculations of reactive multiphase flows in porous media", Univ. Geneve, 2011, pp. 1-116.

Bao et al. ("Lattice Boltzmann Method for Fluid Simulations", NYU, 2011, pp. 1-16) (Year: 2011).

Doolen et al. ("Lattice Boltzmann Method for Fluid Flows", Annual Rev. Fluid Mech. 1998. 30:329-64) (Year: 1998).

Nie et al.("Galilean invariance of lattice Boltzmann models", EPLA, 2008, pp. 1-6).

Inamuro at al.; "A Galilean invariant model of the lattice Boltzmann method for multiphase fluid flows using free-energy approach",Computer Physics Communications 129 (2000) 32-45.

Prosecution File History of U.S. Appl. No. 14/829,933 retrieved on Jan. 9, 2017.

Allahyarov et al.; "Mesoscopic Solvent Simulations: Multiparticle-Collision Dynamics of Three-Dimensinal Flows"; Physical Review E. Statistical Physics, vol. 66, No. 3, Sep. 2002; 10 pages.

Joshi, et al.; "Lattice Boltzmann Method for Multi-Component, Non-Continuum Mass Diffusion"; Journal of Physics D: Applied Physics; vol. 40, No. 23; Dec. 7, 2007; pp. 7593-7600.

Supplemental European Search Report; EP 14 82 8815; dated Feb. 15, 2017; 6 pages.

Prosecution File History of U.S. Appl. No. 15/402,732, filed Jan. 10, 2017.

* cited by examiner

LATTICE BOLTZMANN COLLISION OPERATORS ENFORCING ISOTROPY AND GALILEAN INVARIANCE

CLAIM OF PRIORITY

This application is a continuation of Ser. No. 15/402,732, filed Jan. 10, 2017, which is a continuation of Ser. No. 14/829,933, filed on Aug. 19, 2015, now U.S. Pat. No. 9,576,087, which is a continuation of and claims priority to international patent application number PCT/US2014/048004 filed Jul. 24, 2014, published on Jan. 29, 2015, which claims priority to provisional application No. 61/858,051 filed on Jul. 24, 2013, the entire contents of each of which are incorporated herein by reference.

BACKGROUND

Collision process is one of the two fundamental dynamical processes in a many particle system—another one is advection process. Collision process is essential for individual particles to interact and form a collective behavior. During a collision process, mass, momentum and energy are exchanged among the particles obeying conservation laws. These conservation laws ensure that the overall mass and momentum (and sometimes energy) among the participating particles are unchanged before and after a collision.

SUMMARY

In general, this document describes techniques for simulating, in a lattice velocity set, movement of particles in a volume of fluid, with the movement causing collision among the particles; based on the simulated movement, determining relative particle velocity of a particle at a particular location within the volume, with the relative particle velocity being a difference between (i) an absolute velocity of the particle at the particular location within the volume and measured under zero flow of the volume, and (ii) a mean velocity of one or more of the particles at the particular location within the volume; and determining, based on the relative particle velocity, a non-equilibrium post-collide distribution function of a specified order that is representative of the collision. Other embodiments of this aspect include corresponding computer systems, apparatus, machine-readable hardware storage devices and computer programs recorded on one or more computer storage devices, each configured to perform the actions and the features of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. The features include providing, by one or more computer systems, a lattice velocity set that supports hydrodynamic moments up to an order of particle velocity; wherein simulating comprises simulating by the one or more computer systems. The features also include that the supported order for the lattice velocity set is less than and different from the specified order of the non-equilibrium post-collide distribution function; and the specified order for the non-equilibrium post-collide distribution function is determined by the order of the particle velocity.

The features also include that the mean velocity of the one or more of the particles at the particular location within the volume comprise a mean velocity of a particular type of particles at the particular location. The features also include that the lattice velocity set is a set of state vectors associated with the Lattice Boltzman Method. The features also include that the non-equilibrium post-collide distribution function (i) retains non-equilibrium moments for predefined physical quantities, and (ii) eliminates non-equilibrium moments for undefined physical quantities, up to the specified order. The features also include that the specified order is an exponential value associated with a ratio of the fluid velocity to lattice sound speed, wherein the lattice velocity set supports the exponential value. The features also include that the lattice velocity set comprises a set of momentum states in a space that is limited to a lattice. The features also include that the relative particle velocity is the mean velocity of the one or more of the particles at the particular location within the volume subtracted from the absolute velocity of the particle at the particular location within the volume and measured under zero flow of the volume. The features also include that the non-equilibrium post-collide distribution function is a Galilean invariant filtered operator. The features also include modeling, based on the non-equilibrium post-collide distribution function, a collision process of the particles in the volume of fluid. The features also include that the non-equilibrium post-collide distribution function is a collision operator $C_i^{(1)}(x,t)$ of a first order Galilean invariance in terms of Mach number for a lattice velocity set that provides first order support for hydrodynamic moments; and wherein the collision operator is defined in accordance with:

$$C_i^{(1)}(x, t) = \left(1 - \frac{1}{\tau}\right)\frac{w_i}{2T_0}\left[\left(1 + \frac{c_i \cdot u(x, t)}{T_0}\right)\left(\frac{c_i c_i}{T_0} - I\right) - \frac{c_i u(x, t) + u(x, t)c_i}{T_0}\right] : \Pi^{neq}(x, t);$$

wherein x is the particular location within the volume; wherein t is a particular point in time; wherein i is an index number of lattice velocities in the set; wherein $T_0$ is a constant lattice temperature; wherein $c_i$ is a velocity vector of the particles prior to collision; wherein u(x,t) is mean velocity among the particles at particular location x at time t; wherein I is a second rank unity tensor; wherein $\tau$ is collision relation time; wherein $w_i$ is a constant weighting factor; and wherein $\Pi^{neq}$ is a non-equilibrium momentum flux.

The features also include that the non-equilibrium post-collide distribution function is a collision operator $C_i(x,t)$ for a lattice velocity set that provides an infinite order of support for hydrodynamic moments, and wherein the collision operator is defined in accordance with:

$$C_i(x, t) = \left(1 - \frac{1}{\tau}\right)\frac{f_i^{eq}(x, t)}{2\rho(x, t)T_0}\left[\frac{c_i'(x, t)c_i'(x, t)}{T_0} - I\right] : \Pi^{neq}(x, t);$$

wherein x is the particular location within the volume; wherein t is a particular point in time; wherein i is an index number of lattice velocities in the set; wherein $T_0$ is a constant lattice temperature; wherein I is a second rank unity tensor; wherein τ is collision relation time; wherein $c_i'(x,t)$ is relative particle velocity; wherein ρ is fluid density; wherein $f_i^{eq}$ is an equilibrium distribution function; and wherein $\Pi^{neq}$ is a non-equilibrium momentum flux. The features also include that the non-equilibrium post-collide distribution function is a collision operator $C_i^{(2)}(x,t)$ operator of a second order Galilean invariance in terms of Mach number for a lattice velocity set that provides second order support for hydrodynamic moments; and wherein the collision operator is defined in accordance with:

$$C_i^{(2)}(x,t) = \left(1 - \frac{1}{\tau}\right)\frac{w_i}{2T_0}\left[\left(1 + \frac{c_i \cdot u(x,t)}{T_0} + \frac{(c_i \cdot u(x,t))^2}{2T_0^2} - \frac{u^2(x,t)}{2T_0}\right)\left(\frac{c_i c_i}{T_0} - I\right) - \left(1 + \frac{c_i \cdot u(x,t)}{T_0}\right)\frac{c_i u(x,t) + u(x,t)c_i}{T_0} + u(x,t)u(x,t)\right] : \Pi^{neq}(x,t);$$

wherein x is the particular location within the volume; wherein t is a particular point in time; wherein i is an index number of lattice velocities in the set; wherein $T_0$ is a constant lattice temperature; wherein $c_i$ is a velocity vector of the particles prior to collision; wherein u(x,t) is mean velocity among the particles at particular location x at time t; wherein I is a second rank unity tensor; wherein τ is collision relation time; wherein $w_i$ is a constant weighting factor; and wherein $\Pi^{neq}$ is a non-equilibrium momentum flux. The features also include that the predefined physical quantities comprise mass of the fluid in that particular volume, momentum of the fluid in that particular volume and energy of the fluid in that particular volume.

The features also include that the non-equilibrium post-collide distribution function is a collision operator $C_i(x,t)$ pertaining to energy flux, and wherein the collision operator is defined in accordance with:

$$C_i(x,t) = \left(1 - \frac{1}{\tau_e}\right)\frac{f_i^{eq}(x,t)}{6T_0^3}[c_i'(x,t)c_i'(x,t)c_i'(x,t) - 3c_i'(x,t)T_0 I] : W^{neq}(x,t);$$

wherein x is the particular location within the volume; wherein t is a particular point in time; wherein i is an index number of lattice velocities in the set; wherein $T_0$ is a constant lattice temperature; wherein I is a second rank unity tensor; wherein τ is collision relation time; wherein $c_i'(x,t)$ is relative particle velocity; wherein $f_i^{eq}$ is an equilibrium distribution function; and wherein $W^{neq}$ is a non-equilibrium energy flux.

Implementations of the techniques discussed above may include a method or process, a system or apparatus, or computer software on a computer-accessible medium.

The systems and method and techniques may be implemented using various types of numerical simulation approaches such as the Shan-Chen method for multi-phase flow and the Lattice Boltzmann formulation. Further information about the Lattice Boltzmann formulation will be described herein. However, the systems and techniques described herein are not limited to simulations using the Lattice Boltzmann formulation and can be applied to other numerical simulation approaches.

The systems and techniques may be implemented using a lattice gas simulation that employs a Lattice Boltzmann formulation. The traditional lattice gas simulation assumes a limited number of particles at each lattice site, with the particles being represented by a short vector of bits. Each bit represents a particle moving in a particular direction. For example, one bit in the vector might represent the presence (when set to 1) or absence (when set to 0) of a particle moving along a particular direction. Such a vector might have six bits, with, for example, the values 110000 indicating two particles moving in opposite directions along the X axis, and no particles moving along the Y and Z axes. A set of collision rules governs the behavior of collisions between particles at each site (e.g., a 110000 vector might become a 001100 vector, indicating that a collision between the two particles moving along the X axis produced two particles moving away along the Y axis). The rules are implemented by supplying the state vector to a lookup table, which performs a permutation on the bits (e.g., transforming the 110000 to 001100). Particles are then moved to adjoining sites (e.g., the two particles moving along the Y axis would be moved to neighboring sites to the left and right along the Y axis).

In an enhanced system, the state vector at each lattice site includes many more bits (e.g., 54 bits for subsonic flow) to provide variation in particle energy and movement direction, and collision rules involving subsets of the full state vector are employed. In a further enhanced system, more than a single particle is permitted to exist in each momentum state at each lattice site, or voxel (these two terms are used interchangeably throughout this document). For example, in an eight-bit implementation, 0-255 particles could be moving in a particular direction at a particular voxel. The state vector, instead of being a set of bits, is a set of integers (e.g., a set of eight-bit bytes providing integers in the range of 0 to 255), each of which represents the number of particles in a given state.

In a further enhancement, Lattice Boltzmann Methods (LBM) use a mesoscopic representation of a fluid to simulate 3D unsteady compressible turbulent flow processes in complex geometries at a deeper level than possible with conventional computational fluid dynamics ("CFD") approaches. A brief overview of LBM method is provided below.

Boltzmann-Level Mesoscopic Representation

It is well known in statistical physics that fluid systems can be represented by kinetic equations on the so-called "mesoscopic" level. On this level, the detailed motion of individual particles need not be determined. Instead, properties of a fluid are represented by the particle distribution functions defined using a single particle phase space, $f=f(x,v,t)$, where x is the spatial coordinate while v is the particle velocity coordinate. The typical hydrodynamic quantities, such as mass, density, fluid velocity and temperature, are simple moments of the particle distribution function. The dynamics of the particle distribution functions obeys a Boltzmann equation:

$$\partial_t f + v\nabla_x f + F(x,t)\nabla_v f = C\{f\}, \qquad \text{Eq. (1)}$$

where F(x,t) represents an external or self-consistently generated body-force at (x,t). The collision term C represents interactions of particles of various velocities and locations. It is important to stress that, without specifying a particular form for the collision term C, the above Boltzmann equation is applicable to all fluid systems, and not just to the well-known situation of rarefied gases (as originally constructed by Boltzmann).

Generally speaking, C includes a complicated multi-dimensional integral of two-point correlation functions. For the purpose of forming a closed system with distribution functions $f$ alone as well as for efficient computational purposes, one of the most convenient and physically consistent forms is the well-known BGK operator. The BGK operator is constructed according to the physical argument that, no matter what the details of the collisions, the distribution function approaches a well-defined local equilibrium given by $\{f^{eq}(x,v,t)\}$ via collisions:

$$C = -\frac{1}{\tau}(f - f^{eq}), \quad \text{Eq. (2)}$$

where the parameter $\tau$ represents a characteristic relaxation time to equilibrium via collisions. Dealing with particles (e.g., atoms or molecules) the relaxation time is typically taken as a constant. In a "hybrid" (hydro-kinetic) representation, this relaxation time is a function of hydrodynamic variables like rate of strain, turbulent kinetic energy and others. Thus, a turbulent flow may be represented as a gas of turbulence particles ("eddies") with the locally determined characteristic properties.

Numerical solution of the Boltzmann-BGK equation has several computational advantages over the solution of the Navier-Stokes equations. First, it may be immediately recognized that there are no complicated nonlinear terms or higher order spatial derivatives in the equation, and thus there is little issue concerning advection instability. At this level of description, the equation is local since there is no need to deal with pressure, which offers considerable advantages for algorithm parallelization. Another desirable feature of the linear advection operator, together with the fact that there is no diffusive operator with second order spatial derivatives, is its ease in realizing physical boundary conditions such as no-slip surface or slip-surface in a way that mimics how particles truly interact with solid surfaces in reality, rather than mathematical conditions for fluid partial differential equations ("PDEs"). One of the direct benefits is that there is no problem handling the movement of the interface on a solid surface, which helps to enable lattice-Boltzmann based simulation software to successfully simulate complex turbulent aerodynamics. In addition, certain physical properties from the boundary, such as finite roughness surfaces, can also be incorporated in the force. Furthermore, the BGK collision operator is purely local, while the calculation of the self-consistent body-force can be accomplished via near-neighbor information only. Consequently, computation of the Boltzmann-BGK equation can be effectively adapted for parallel processing.

Lattice Boltzmann Formulation

Solving the continuum Boltzmann equation represents a significant challenge in that it entails numerical evaluation of an integral-differential equation in position and velocity phase space. A great simplification took place when it was observed that not only the positions but the velocity phase space could be discretized, which resulted in an efficient numerical algorithm for solution of the Boltzmann equation. The hydrodynamic quantities can be written in terms of simple sums that at most depend on nearest neighbor information. Even though historically the formulation of the lattice Boltzmann equation was based on lattice gas models prescribing an evolution of particles on a discrete set of velocities $v(\in\{c_i, i=1, \ldots, b\})$, this equation can be systematically derived from the first principles as a discretization of the continuum Boltzmann equation. As a result, LBE does not suffer from the well-known problems associated with the lattice gas approach. Therefore, instead of dealing with the continuum distribution function in phase space, $f(x,v,t)$, it is only necessary to track a finite set of discrete distributions, $f_i(x,t)$ with the subscript labeling the discrete velocity indices. The key advantage of dealing with this kinetic equation instead of a macroscopic description is that the increased phase space of the system is offset by the locality of the problem.

Due to symmetry considerations, the set of velocity values are selected in such a way that they form certain lattice structures when spanned in the configuration space. The dynamics of such discrete systems obeys the LBE having the form $f_i(x+c_i,t+1)-f_i(x,t)=C_i(x,t)$, where the collision operator usually takes the BGK form as described above. By proper choices of the equilibrium distribution forms, it can be theoretically shown that the lattice Boltzmann equation gives rise to correct hydrodynamics and thermo-hydrodynamics. That is, the hydrodynamic moments derived from $f_i(x,t)$ obey the Navier-Stokes equations in the macroscopic limit. These moments are defined as:

$$\rho(x, t) = \sum_i f_i(x, t); \quad \text{Eq. (3)}$$

$$\rho u(x, t) = \sum_i c_i f_i(x, t);$$

$$DT(x, t) = \sum_i (c_i - u)^2 f_i(x, t),$$

where $\rho$, u, and T are, respectively, the fluid density, velocity and temperature, and D is the dimension of the discretized velocity space (not at all equal to the physical space dimension).

Other features and advantages will be apparent from the following description, including the drawings, and the claims.

DESCRIPTION

Figure 1:
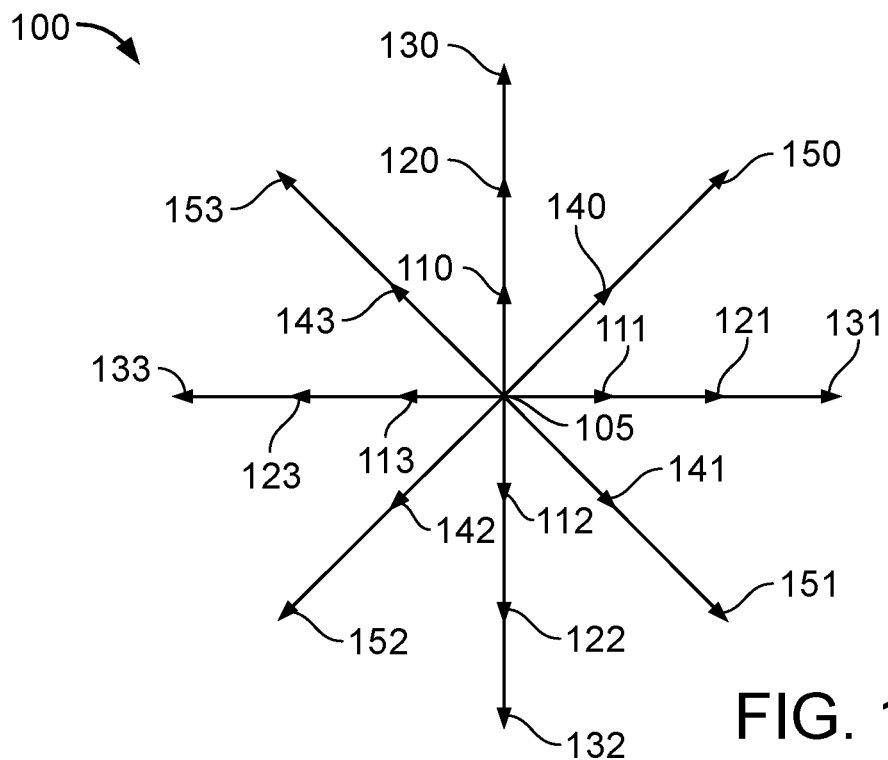
FIGS. 1 and 2 illustrate velocity components of two LBM models.

A. Collision Operator that Retains Specified Non-Equilibrium Moments and Eliminates Other Non-Equilibrium Moments In a simulation system such as a lattice Boltzmann simulation, the simulated space is divided into multiple, discrete points that are connected by straight lines and therefore provide a discrete number of points and directions. The simulation is also constrained to a discrete set of time steps. In such a system, in order for the simulation to approximate a real world flow, multiple different quantities must be conserved. For example, the system conserves mass, momentum and energy. Accordingly, the simulation needs to be configured to have the appropriate mass flux, momentum flux and energy flux. These conserved quantities together with their fluxes are the essential moments in the simulation system that are associated with the true physical world. However, when conserving these quantities, the simulation can unintentionally excite additional moment quantities due to discrete velocity space (e.g., the discrete set of directions and distances a particle can travel at a given time step). Quantities that are unintentionally generated (referred to herein as, unintentional or unwanted invariants, conserved or non-equilibrium moments) can negatively influence the simulation results. For example, such unwanted quantities can result in wrong fluid dynamic behavior and numerical instability of the computational result.

In order to reduce the effect of unintentionally generated invariant quantities, a collision operator is described herein that retains the non-equilibrium moments only for the conserved physical quantities, while eliminating all the rest non-equilibrium moments, up to a desired order. Here, an order of a collision operator is defined in terms of exponent on the lattice Mach number (a ratio of fluid velocity and lattice sound speed.) The trade-off for ensuring that the undesirable non-equilibrium moments will be filtered is increased computational time and processing. In the collision operators described herein, theoretical forms are systematically constructed up to an arbitrary order for both momentum and energy non-equilibrium fluxes. Thus, these collision operators satisfy the conservation of mass, momentum, energy, ensure correct mass flux, momentum flux and energy flux up to a selected order, while concurrently eliminating all undesirable non-equilibrium moments up to a selected order. In the simulation system, selecting a higher order for the filtering scheme produce a lesser unphysical effect or influence when compared to lower order when dealing with either high speed flow or low viscosity.

B. Model Simulation Space

In a LBM-based physical process simulation system, fluid flow may be represented by the distribution function values $f_i$, evaluated at a set of discrete velocities $c_i$. The dynamics of the distribution function is governed by Equation 4 where $f_i(0)$ is known as the equilibrium distribution function, defined as:

$$f_\alpha^{(0)} = w_\alpha \rho \left[ 1 + u_\alpha + \frac{u_\alpha^2 - u^2}{2} + \frac{u_\alpha(u_\alpha^2 - 3u^2)}{6} \right] \quad \text{Eq. (4)}$$

where $$u_\alpha = \frac{c_i u}{T} \cdot f_i(x + e_i, t+1) - f_i(x, t) = \frac{1}{\tau}[f_i(x,t) - f_i^{(eq)}(x,t)] \quad \text{Eq. (5)}$$

This equation is the well-known lattice Boltzmann equation that describe the time-evolution of the distribution function, $f_i$. The left-hand side represents the change of the distribution due to the so-called "streaming process." The streaming process is when a pocket of fluid starts out at a grid location, and then moves along one of the velocity vectors to the next grid location. At that point, the "collision operator," i.e., the effect of nearby pockets of fluid on the starting pocket of fluid, is calculated. The fluid can only move to another grid location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator used here is due to Bhatnagar, Gross and Krook (BGK). It forces the distribution function to go to the prescribed values given by the second equation, which is the "equilibrium" form.

From this simulation, conventional fluid variables, such as mass $\rho$ and fluid velocity u, are obtained as simple summations in Equation (3). Here, the collective values of $c_i$ and $w_i$ define a LBM model. The LBM model can be implemented efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken.

In a fluid system, a small disturbance of the density travels at the speed of sound. In a gas system, the speed of the sound is generally determined by the temperature. The importance of the effect of compressibility in a flow is measured by the ratio of the characteristic velocity and the sound speed, which is known as the Mach number.

Referring to FIG. 1, a first model (2D-1) 100 is a two-dimensional model that includes 21 velocities. Of these 21 velocities, one (105) represents particles that are not moving; three sets of four velocities represent particles that are moving at either a normalized speed (r) (110-113), twice the normalized speed (2r) (120-123), or three times the normalized speed (3r) (130-133) in either the positive or negative direction along either the x or y axis of the lattice; and two sets of four velocities represent particles that are moving at the normalized speed (r) (140-143) or twice the normalized speed (2r) (150-153) relative to both of the x and y lattice axes.

Figure 2:
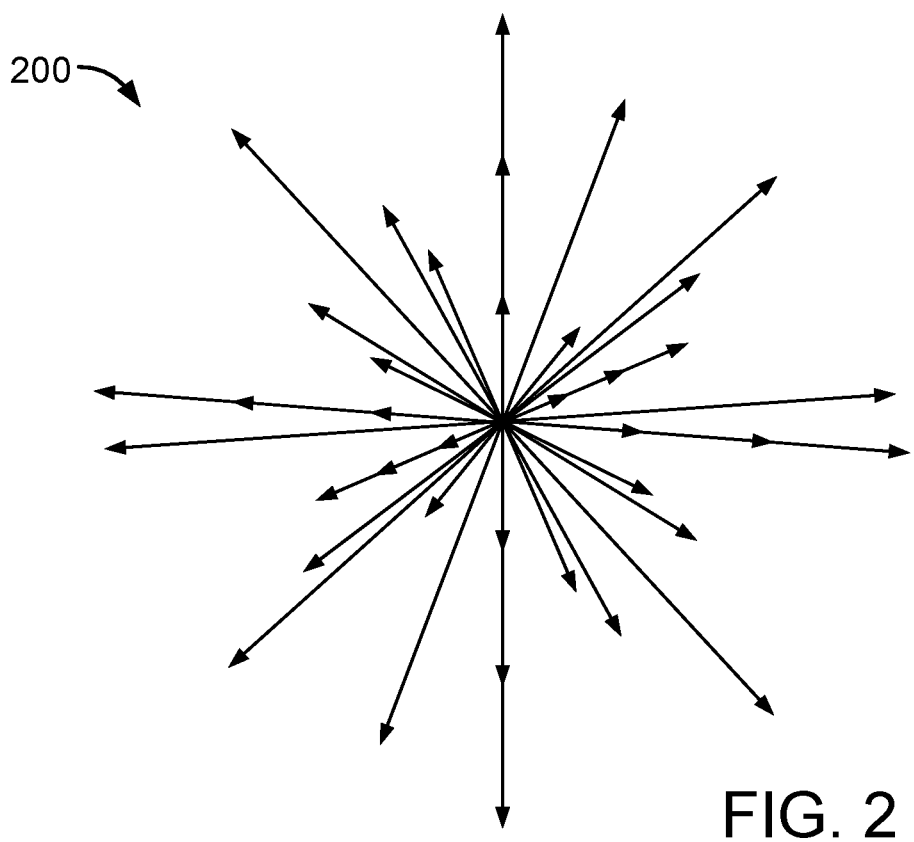

As also illustrated in FIG. 2, a second model (3D-1) 200 is a three-dimensional model that includes 39 velocities, where each velocity is represented by one of the arrowheads of FIG. 2. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used.

For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows can be simulated with high fidelity.

Figure 3:
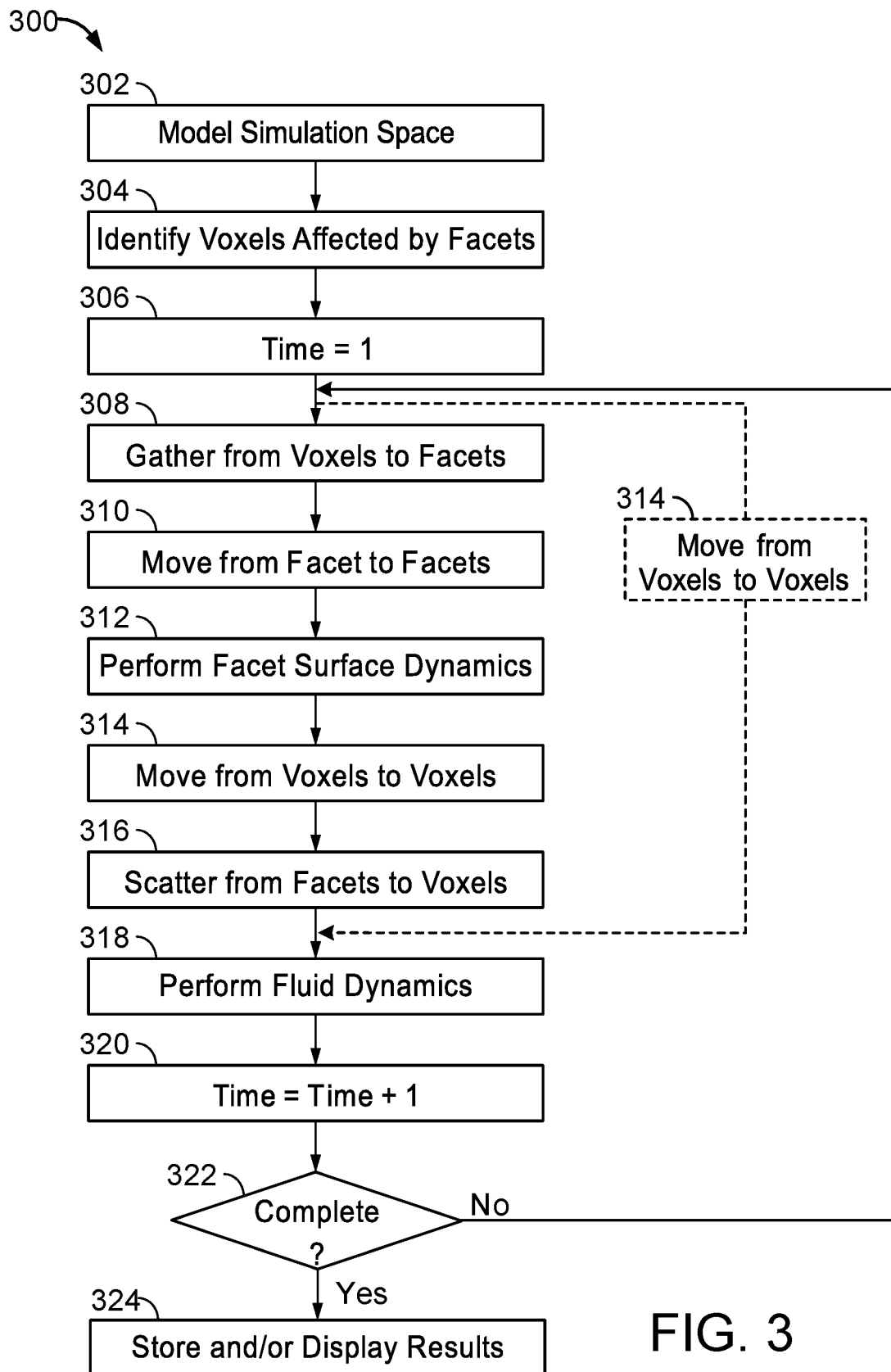
FIG. 3 is a flow chart of a procedure followed by a physical process simulation system.

Referring to FIG. 3, a physical process simulation system operates according to a procedure 300 to simulate a physical process such as fluid flow. Prior to the simulation, a simulation space is modeled as a collection of voxels (step 302). Typically, the simulation space is generated using a computer-aided-design (CAD) program. For example, a CAD program could be used to draw an micro-device positioned in a wind tunnel. Thereafter, data produced by the CAD program is processed to add a lattice structure having appropriate resolution and to account for objects and surfaces within the simulation space.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re = uL/v \qquad \text{Eq. (6)}$$

The characteristic length of an object represents large scale features of the object. For example, if flow around a micro-device were being simulated, the height of the micro-device might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i(x,t)$, where $f_i$ represents the number of elements, or particles, per unit volume in state i (i.e., the density of particles in state i) at a lattice site denoted by the three-dimensional vector x at a time t. For a known time increment, the number of particles is referred to simply as $f_i(x)$. The combination of all states of a lattice site is denoted as $f(x)$.

The number of states is determined by the number of possible velocity vectors within each energy level. The velocity vectors consist of integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i = (c_{i,x}, c_{i,y}, c_{i,z}) \qquad \text{Eq. (7)}$$

The energy level zero state represents stopped particles that are not moving in any dimension, i.e. $c_{stopped} = (0, 0, 0)$. Energy level one states represents particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

Figure 4:
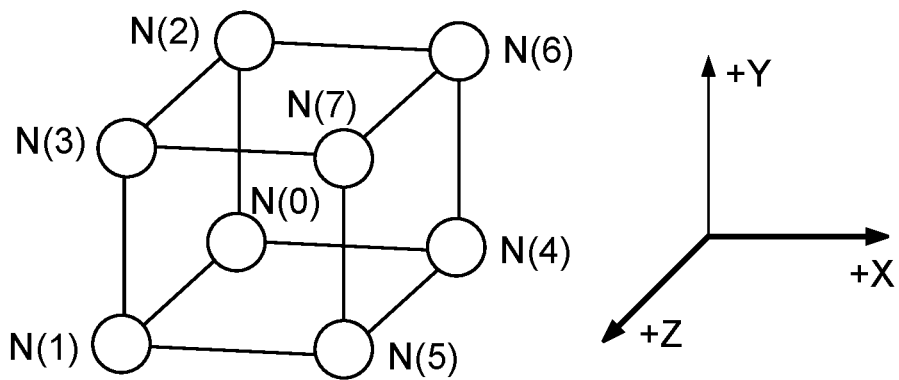
FIG. 4 is a perspective view of a microblock.

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i(n)$, where n represents the relative position of the lattice site within the microblock and $n \in \{0, 1, 2, \ldots, 7\}$. A microblock is illustrated in FIG. 4.

Figure 5A:
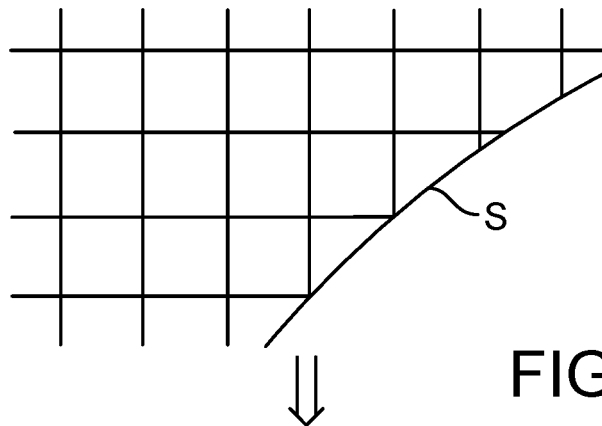
FIGS. 5A and 5B are illustrations of lattice structures used by the system of FIG. 3.
Figure 5B:
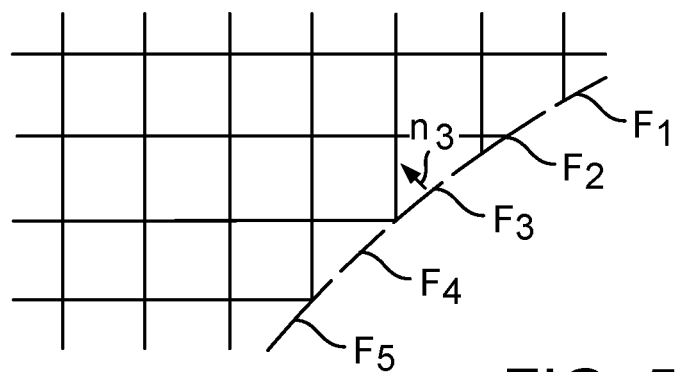

Referring to FIGS. 5A and 5B, a surface S is represented in the simulation space (FIG. 5B) as a collection of facets $F_\alpha$:

$$S = \{F_\alpha\} \qquad \text{Eq. (8)}$$

where α is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal ($n_\alpha$), a surface area ($A_\alpha$), a center location ($x_\alpha$), and a facet distribution function ($f_i(\alpha)$) that describes the surface dynamic properties of the facet.

Figure 6:
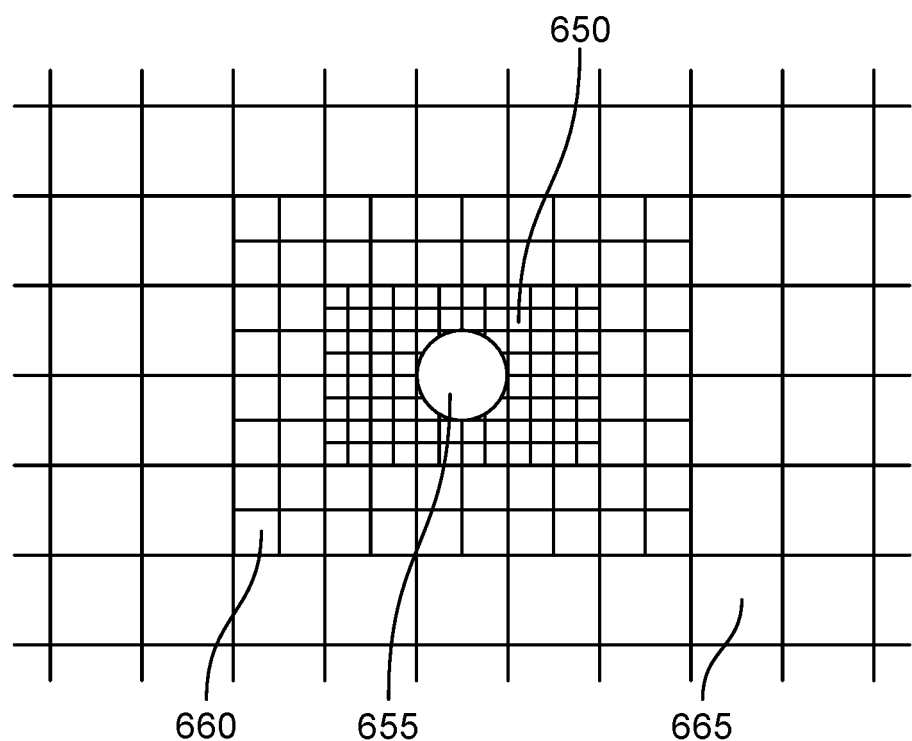
FIGS. 6 and 7 illustrate variable resolution techniques.
Figure 7:
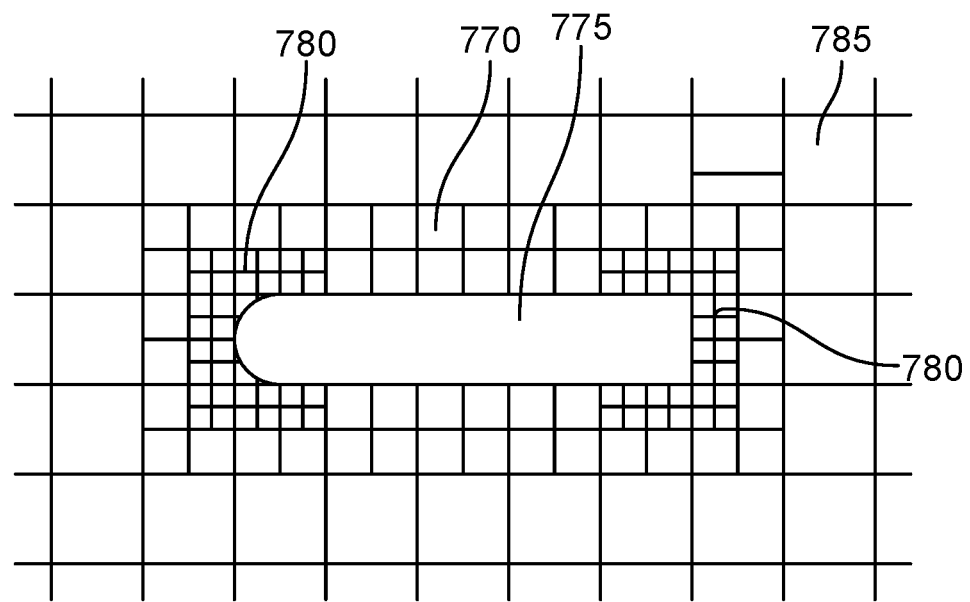

Referring to FIG. 6, different levels of resolution may be used in different regions of the simulation space to improve processing efficiency. Typically, the region 650 around an object 655 is of the most interest and is therefore simulated with the highest resolution. Because the effect of viscosity decreases with distance from the object, decreasing levels of resolution (i.e., expanded voxel volumes) are employed to simulate regions 660, 665 that are spaced at increasing distances from the object 655. Similarly, as illustrated in FIG. 7, a lower level of resolution may be used to simulate a region 770 around less significant features of an object 775 while the highest level of resolution is used to simulate regions 780 around the most significant features (e.g., the leading and trailing surfaces) of the object 775. Outlying regions 785 are simulated using the lowest level of resolution and the largest voxels.

C. Identify Voxels Affected by Facets

Referring again to FIG. 3, once the simulation space has been modeled (step 302), voxels affected by one or more facets are identified (step 304). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 8:
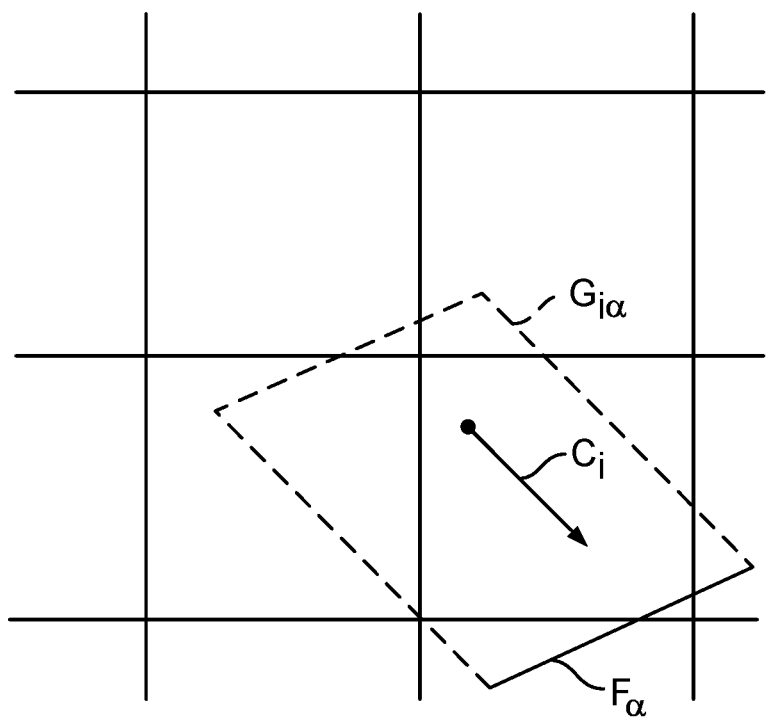
FIG. 8 illustrates regions affected by a facet of a surface.

Referring to FIG. 8, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_i|$) and a base defined by the surface area $A_\alpha$ of the facet so that the volume $V_{i\alpha}$ of the parallelepiped $G_{i\alpha}$ equals:

$$V_{i\alpha}=|c_i n_\alpha|A_\alpha \qquad \text{Eq. (9)}$$

The facet $F_\alpha$ receives particles from the volume $V_{i\alpha}$ when the velocity vector of the state is directed toward the facet ($|c_i \, n_i|<0$), and transfers particles to the region when the velocity vector of the state is directed away from the facet ($|c_i \, n_i|>0$). As will be discussed below, this expression must be modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x)=N_i(x)V_{i\alpha}(x). \qquad \text{Eq. (10)}$$

When the parallelepiped $G_{i\alpha}$ is intersected by one or more facets, the following condition is true:

$$V_{i\alpha}=\Sigma V_\alpha(x)+\Sigma V_{i\alpha}(\beta) \qquad \text{Eq. (11)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha}=\Sigma V_{i\alpha}(x). \qquad \text{Eq. (12)}$$

D. Perform Simulation

Once the voxels that are affected by one or more facets are identified (step 304), a timer is initialized to begin the simulation (step 306). During each time increment of the simulation, movement of particles from voxel to voxel is simulated by an advection stage (steps 308-316) that accounts for interactions of the particles with surface facets. Next, a collision stage (step 318) simulates the interaction of particles within each voxel. Thereafter, the timer is incremented (step 320). If the incremented timer does not indicate that the simulation is complete (step 322), the advection and collision stages (steps 308-320) are repeated. If the incremented timer indicates that the simulation is complete (step 322), results of the simulation are stored and/or displayed (step 324).

1. Boundary Conditions for Surface

To correctly simulate interactions with a surface, each facet must meet four boundary conditions. First, the combined mass of particles received by a facet must equal the combined mass of particles transferred by the facet (i.e., the net mass flux to the facet must equal zero). Second, the combined energy of particles received by a facet must equal the combined energy of particles transferred by the facet (i.e., the net energy flux to the facet must equal zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux must equal zero and the net normal momentum flux must equal the local pressure at the facet. Thus, the components of the combined received and transferred momentums that are perpendicular to the normal $n_\alpha$ of the facet (i.e., the tangential components) must be equal, while the difference between the components of the combined received and transferred momentums that are parallel to the normal $n_\alpha$ of the facet (i.e., the normal components) must equal the local pressure at the facet. For non-slip surfaces, friction of the surface reduces the combined tangential momentum of particles transferred by the facet relative to the combined tangential momentum of particles received by the facet by a factor that is related to the amount of friction.

2. Gather from Voxels to Facets

As a first step in simulating interaction between particles and a surface, particles are gathered from the voxels and provided to the facets (step 308). As noted above, the flux of state i particles between a voxel N(x) and a facet $F_\alpha$ is:

$$\Gamma_{i\alpha}(x)=N_i(x)V_{i\alpha}(x). \qquad \text{Eq. (13)}$$

From this, for each state i directed toward a facet $F_\alpha(c_i n_\alpha<0)$, the number of particles provided to the facet $F_\alpha$ by the voxels is:

$$\Gamma_{i\alpha V \to F}=\sum_x \Gamma_{i\alpha}(x) = \sum_x N_i(x)V_{i\alpha}(x) \qquad \text{Eq. (14)}$$

Only voxels for which $V_{i\alpha}(x)$ has a non-zero value must be summed. As noted above, the size of the facets is selected so that $V_{i\alpha}(x)$ has a non-zero value for only a small number of voxels. Because $V_{i\alpha}(x)$ and $P_f(x)$ may have non-integer values, $\Gamma_\alpha(x)$ is stored and processed as a real number.

3. Move from Facet to Facet

Figure 10:
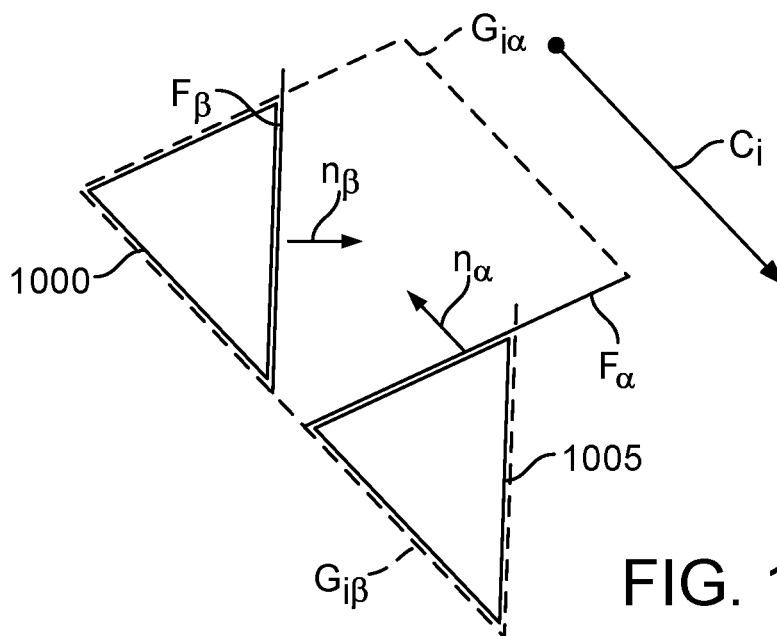
FIG. 10 illustrates movement of particles from a surface to a surface.

Next, particles are moved between facets (step 310). If the parallelepiped $G_{i\alpha}$ for an incoming state ($c_i n_\alpha < 0$) of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment. This relationship is illustrated in FIG. 10, where a portion 1000 of the parallelepiped $G_{i\alpha}$ that is intersected by facet $F_\beta$ equals a portion 1005 of the parallelepiped $G_{i\beta}$ that is intersected by facet $F_\alpha$. As noted above, the intersected portion is denoted as $V_{i\alpha}(\beta)$. Using this term, the flux of state i particles between a facet $F_\beta$ and a facet $F_\alpha$ may be described as:

$$\Gamma_{i\alpha}(\beta, t-1) = \Gamma_i(\beta) V_{i\alpha}(\beta)/V_{i\alpha}, \quad \text{Eq. (15)}$$

where $\Gamma_i(\beta, t-1)$ is a measure of the state i particles produced by the facet $F_\beta$ during the previous time increment. From this, for each state i directed toward a facet $F_\alpha(c_i n_\alpha < 0)$, the number of particles provided to the facet $F_\alpha$ by the other facets is:

$$\Gamma_{i\alpha F \to F} = \sum_\beta \Gamma_{i\alpha}(\beta) = \sum_\beta \Gamma_i(\beta, t-1) V_{i\alpha}(\beta)/V_{i\alpha} \quad \text{Eq. (16)}$$

and the total flux of state i particles into the facet is:

$$\Gamma_{iIN}(\alpha) = \quad \text{Eq. (17)}$$
$$\Gamma_{i\alpha V \to F} + \Gamma_{i\alpha F \to F} = \sum_x N_i(x) V_{i\alpha}(x) + \sum_\beta \Gamma_i(\beta, t-1) V_{i\alpha}(\beta)/V_{i\alpha}$$

The state vector $N(\alpha)$ for the facet, also referred to as a facet distribution function, has M entries corresponding to the M entries of the voxel states vectors. M is the number of discrete lattice speeds. The input states of the facet distribution function $N(\alpha)$ are set equal to the flux of particles into those states divided by the volume $V_{i\alpha}$:

$$N_i(\alpha) = \Gamma_{iIN}(\alpha)/V_{i\alpha}, \quad \text{Eq. (18)}$$

for $c_i n_\alpha < 0$.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha) = \Gamma_{iOTHER}(\alpha)/V \quad \text{Eq. (19)}$$

for $c_i n_\alpha \geq 0$, wherein $\Gamma_{iOTHER}(\alpha)$ is determined using the technique described above for generating $\Gamma_{iIN}(\alpha)$, but applying the technique to states ($c_i n_\alpha \geq 0$) other than incoming states ($c_i n_\alpha < 0$). In an alternative approach, $\Gamma_{iOTHER}(\alpha)$ may be generated using values of $\Gamma_{iOUT}(\alpha)$ from the previous time step so that:

$$\Gamma_{iOTHER}(\alpha, t) = \Gamma_{iOUT}(\alpha, t-1). \quad \text{Eq. (20)}$$

For parallel states ($c_i n_\alpha = 0$), both $V_{i\alpha}$ and $V_{i\alpha}(x)$ are zero. In the expression for $N_i(\alpha)$, $V_{i\alpha}(x)$ appears in the numerator (from the expression for $\Gamma_{iOTHER}(\alpha)$ and $V_{i\alpha}$ appears in the denominator (from the expression for $N_i(\alpha)$). Accordingly, $N_i(\alpha)$ for parallel states is determined as the limit of $N_i(\alpha)$ as $V_{i\alpha}$ and $V_{i\alpha}(x)$ approach zero.

The values of states having zero velocity (i.e., rest states and states (0, 0, 0, 2) and (0, 0, 0, −2)) are initialized at the beginning of the simulation based on initial conditions for temperature and pressure. These values are then adjusted over time.

4. Perform Facet Surface Dynamics

Figure 11:
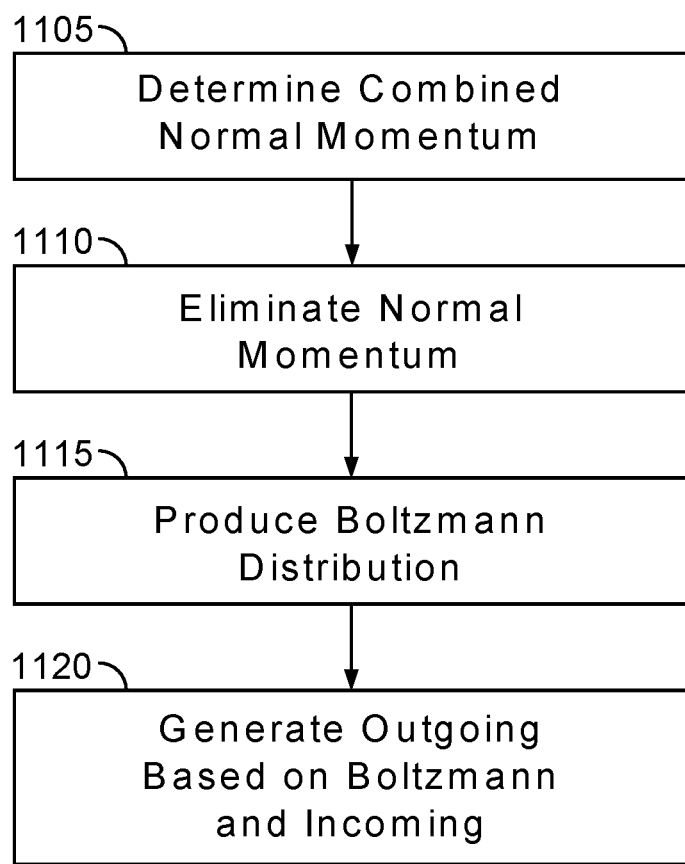
FIG. 11 is a flow chart of a procedure for performing surface dynamics.

Next, surface dynamics are performed for each facet to satisfy the four boundary conditions discussed above (step 312). A procedure for performing surface dynamics for a facet is illustrated in FIG. 11. Initially, the combined momentum normal to the facet $F_\alpha$ is determined (step 1105) by determining the combined momentum $P(\alpha)$ of the particles at the facet as:

$$P(\alpha) = \sum_i c_i * N_i^\alpha \quad \text{Eq. (21)}$$

for all i. From this, the normal momentum $P_n(\alpha)$ is determined as:

$$P_n(\alpha) = n_\alpha \cdot P(\alpha). \quad \text{Eq. (22)}$$

This normal momentum is then eliminated using a pushing/pulling technique (step 1110) to produce $N_{n-}(\alpha)$. According to this technique, particles are moved between states in a way that affects only normal momentum. The pushing/pulling technique is described in U.S. Pat. No. 5,594,671, which is incorporated by reference.

Thereafter, the particles of $N_{n-}(\alpha)$ are collided to produce a Boltzmann distribution $N_{n-\beta}(\alpha)$ (step 1115). As described below with respect to performing fluid dynamics, a Boltzmann distribution may be achieved by applying a set of collision rules to $N_{n-}(\alpha)$.

An outgoing flux distribution for the facet $F_\alpha$ is then determined (step 1120) based on the incoming flux distribution and the Boltzmann distribution. First, the difference between the incoming flux distribution $\Gamma_i(\alpha)$ and the Boltzmann distribution is determined as:

$$\Delta \Gamma_i(\alpha) = \Gamma_{iIN}(\alpha) - N_{n-\beta i}(\alpha) V_{i\alpha}. \quad \text{Eq. (23)}$$

Using this difference, the outgoing flux distribution is:

$$\Gamma_{iOUT}(\beta) = N_{n-\beta i}(\alpha) V_{i\alpha} - \Delta \Gamma_{i*}(\alpha), \quad \text{Eq. (24)}$$

for $n_\alpha c_i > 0$ and where i* is the state having a direction opposite to state i. For example, if state i is (1, 1, 0, 0), then state i* is (−1, −1, 0, 0). To account for skin friction and other factors, the outgoing flux distribution may be further refined to:

$$\Gamma_{iOUT}(\alpha) = \quad \text{Eq. (25)}$$
$$N_{n-Bi}(\alpha) V_{i\alpha} - \Delta \Gamma_{i*}(\alpha) + C_f(n_\alpha \cdot c_i)\left[N_{n-Bi*}(\alpha) - N_{n-Bi}(\alpha)\right] V_{i\alpha} +$$
$$(n_\alpha \cdot c_i)(t_{1\alpha} \cdot c_i) \Delta N_{j,1} V_{i\alpha} + (n_\alpha \cdot c_i)(t_{2\alpha} \cdot c_i) \Delta N_{j,2} V_{i\alpha}$$

for $n_\alpha c_i > 0$, where $C_f$ is a function of skin friction, $t_{1\alpha}$ is a first tangential vector that is perpendicular to $n_\alpha$, $t_{2\alpha}$, is a second tangential vector that is perpendicular to both $n_\alpha$ and $t_{1\alpha}$, and $\Delta N_{j,1}$ and $\Delta N_{j,2}$ are distribution functions corresponding to the energy (j) of the state i and the indicated tangential vector. The distribution functions are determined according to:

$$\Delta N_{j,1,2} = -\frac{1}{2j^2}\left(n_\alpha \cdot \sum_i c_i c_i N_{n-Bi}(\alpha) \cdot t_{1,2\alpha}\right) \quad \text{Eq. (26)}$$

where j equals 1 for energy level 1 states and 2 for energy level 2 states.

The functions of each term of the equation for $\Gamma_{iOUT}(\alpha)$ are as follows. The first and second terms enforce the normal momentum flux boundary condition to the extent that collisions have been effective in producing a Boltzmann distribution, but include a tangential momentum flux anomaly. The fourth and fifth terms correct for this anomaly, which may arise due to discreteness effects or non-Boltzmann structure due to insufficient collisions. Finally, the third term adds a specified amount of skin fraction to enforce a desired change in tangential momentum flux on the surface. Generation of the friction coefficient $C_f$ is described below. Note that all terms involving vector manipulations are geometric factors that may be calculated prior to beginning the simulation.

From this, a tangential velocity is determined as:

$$u_i(\alpha) = (P(\alpha) - P_n(\alpha)n_\alpha)/\rho, \quad \text{Eq. (27)}$$

where $\rho$ is the density of the facet distribution:

$$\rho = \sum_i N_i(\alpha) \quad \text{Eq. (28)}$$

As before, the difference between the incoming flux distribution and the Boltzmann distribution is determined as:

$$\Delta\Gamma_i(\alpha) = \Gamma_{iIN}(\alpha) - N_{n-\beta i}(\alpha) V_{i\alpha}. \quad \text{Eq. (29)}$$

The outgoing flux distribution then becomes:

$$\Gamma_{iOUT}(\alpha) = N_{n-\beta i}(\alpha)V_{i\alpha} - \Delta\Gamma_i^*(\alpha) + C_f(n_\alpha c_i)[N_{n-\beta i}^*(\alpha) - N_{n-\beta i}(\alpha)]V_{i\alpha}, \quad \text{Eq. (30)}$$

which corresponds to the first two lines of the outgoing flux distribution determined by the previous technique but does not require the correction for anomalous tangential flux.

Using either approach, the resulting flux-distributions satisfy all of the momentum flux conditions, namely:

$$\sum_{i,c_i \cdot n_\alpha > 0} c_i \Gamma_{i\alpha OUT} - \sum_{i,c_i \cdot n_\alpha < 0} c_i \Gamma_{i\alpha IN} = p_\alpha n_\alpha A_\alpha - C_f p_\alpha u_\alpha A_\alpha \quad \text{Eq. (31)}$$

where $p_\alpha$ is the equilibrium pressure at the facet $F_\alpha$ and is based on the averaged density and temperature values of the voxels that provide particles to the facet, and $u_\alpha$ is the average velocity at the facet.

To ensure that the mass and energy boundary conditions are met, the difference between the input energy and the output energy is measured for each energy level j as:

$$\Delta\Gamma_{\alpha mj} = \sum_{i,c_{ji} \cdot n_\alpha < 0} \Gamma_{\alpha,jiIn} - \sum_{i,c_{ji} \cdot n_\alpha > 0} \Gamma_{\alpha jiOUT} \quad \text{Eq. (32)}$$

where the index j denotes the energy of the state i. This energy difference is then used to generate a difference term:

$$\delta\Gamma_{\alpha ji} = V_{i\alpha}\Delta\Gamma_{\alpha mj} \Big/ \sum_{i,c_{ji} \cdot n_\alpha < 0} V_{i\alpha} \quad \text{Eq. (33)}$$

for $c_{ji} n_\alpha > 0$. This difference term is used to modify the outgoing flux so that the flux becomes:

$$\Gamma_{\alpha jiOUTf} = \Gamma_{\alpha jiOUT} + \delta\Gamma_{\alpha ji} \quad \text{Eq. (34)}$$

for $c_{ji} n_\alpha > 0$. This operation corrects the mass and energy flux while leaving the tangential momentum flux unaltered. This adjustment is small if the flow is approximately uniform in the neighborhood of the facet and near equilibrium. The resulting normal momentum flux, after the adjustment, is slightly altered to a value that is the equilibrium pressure based on the neighborhood mean properties plus a correction due to the non-uniformity or non-equilibrium properties of the neighborhood.

5. Move from Voxels to Voxels

Referring again to FIG. 3, particles are moved between voxels along the three-dimensional rectilinear lattice (step 314). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +1x and +1y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

Figure 9:
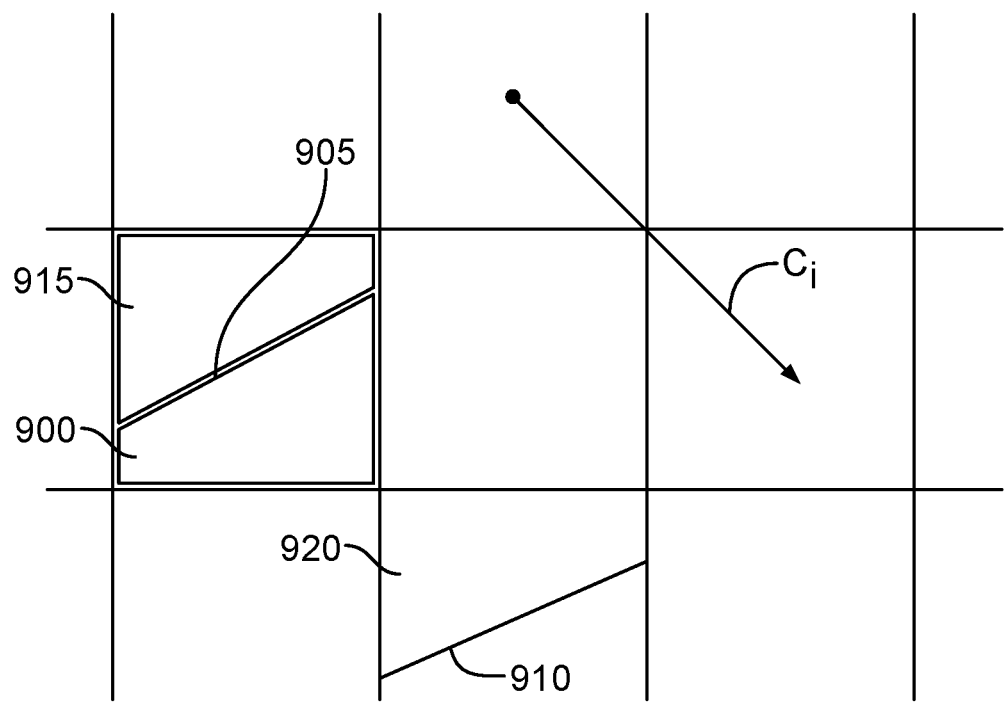
FIG. 9 illustrates movement of particles from a voxel to a surface.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet. For example, referring to FIG. 9, when a portion 900 of the state i particles for a voxel 905 is moved to a facet 910 (step 308), the remaining portion 915 is moved to a voxel 920 in which the facet 910 is located and from which particles of state i are directed to the facet 910. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel N(f) occupied by one or more facets is:

$$N_i(F) = N_i(x)\left(1 - \sum_\alpha V_{i\alpha}(x)\right) \quad \text{Eq. (35)}$$

where N(x) is the source voxel.

6. Scatter From Facets to Voxels

Next, the outgoing particles from each facet are scattered to the voxels (step 316). Essentially, this step is the reverse of the gather step by which particles were moved from the voxels to the facets. The number of state i particles that move from a facet $F_\alpha$ to a voxel N(x) is:

$$N_{\alpha i F \to V} = \frac{1}{P_f(x)} V_{\alpha i}(x) \Gamma_{\alpha i OUT_f} / V_{\alpha i} \quad \text{Eq. (36)}$$

where $P_f(x)$ accounts for the volume reduction of partial voxels. From this, for each state i, the total number of particles directed from the facets to a voxel $N_{(x)}$ is:

$$N_{iF \to V} = \frac{1}{P_f(x)} \sum_\alpha V_{\alpha i}(x) \Gamma_{\alpha i OUT_f} / V_{\alpha i} \quad \text{Eq. (37)}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Finally, fluid dynamics are performed (step 318). This step may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation 1 and Equation 2. After the advection step, the conserved quantities of a fluid system, specifically the density, momentum and the energy are obtained from the distribution function using Equation 3. From these quantities, the equilibrium distribution function, noted by $f^{eq}$ in equation (2), is fully specified by Equation (4). The choice of the velocity vector set $c_i$, the weights, both are listed in Table 1, together with Equation 2 ensures that the macroscopic behavior obeys the correct hydrodynamic equation.

E. Collision Process

To reproduce relevant fluid physics, a collision process in a lattice Boltzmann system plays the same fundamental roles and subject to the same fundamental conservation requirements as in a real fluid system. For purposes of convenience, the below equations will be numbered, starting with equation (1.1). Let $f_i(x,t)$ be the "pre-collide" particle distribution function (i.e., the number of particles at location x per unit volume at time t, and all having a velocity vector value $c_i$ prior to a collision), then this distribution is changed to $f_i'(x,t)$ after a collision (i.e., the "post-collide" distribution). The mass conservation is satisfied below, $$\sum_i f_i(x,t) = \sum_i f_i'(x,t) = \rho(x,t) \quad (1.1)$$

where $\rho(x,t)$ is the fluid density that is equal to particle number density of all velocity vector values at location x and time t. The summation in (1.1) (and in subsequent equations) is for all possible particle velocity vector values in a lattice Boltzmann model. The momentum conservation is given by, $$\sum_i c_i f_i(x,t) = \sum_i c_i f_i'(x,t) = \rho(x,t) u(x,t) \quad (1.2)$$

where u(x,t) is the fluid velocity that is simply the mean velocity among particles at location x and time t.

For certain fluid systems (consists of many particles) in which the particle kinetic energy is also conserved, then the following relationship is defined, in addition to (1.1) and (1.2), $$\sum_i c_i f_i(x,t) = \sum_i e_i f_i'(x,t) = \frac{1}{2}\rho(x,t)(u^2(x,t) + DT(x,t)) \quad (1.3)$$

where $e_i = \frac{1}{2}c_i^2$, and the constant D is the dimension of particle motion. T(x,t) is the temperature of the fluid system at x and t.

Obviously due to conservation laws, values of $\rho(x,t)$ and u(x,t) (and T(x,t) for an energy conserved system) are invariant during a collision process. For a given $\rho(x,t)$ and u(x,t) (and T(x,t)), there also exists a special type of particle distribution function, $f_i^{eq}(x,t)$, referred to as the equilibrium distribution function. The equilibrium distribution function has the same mass and momentum (and energy) values defined in eqns. (1.1) and (1.2) (and (1.3)), and it is completely determined as a function of $\rho(x,t)$ and u(x,t) (and T(x,t)).

Quantities in terms of summations (over particle velocity vector values) of distribution functions are in general referred to as moments of distribution functions. Besides the three fundamental moments of (1.1)-(1.3) corresponding to conserved macroscopic quantities of mass, momentum and energy, moments corresponding to their fluxes are of equal importance. These can be defined in terms of summations of post-collide distribution functions, $$\rho(x,t)u(x,t) = \sum_i c_i f_i'(x,t) \qquad (1.4)$$

$$\Pi(x,t) = \sum_i c_i c_i f_i'(x,t) \qquad (1.5)$$

$$Q(x,t) = \sum_i c_i c_i c_i f_i'(x,t) \qquad (1.6)$$

Here $\Pi(x,t)$ and $Q(x,t)$ are, respectively, the momentum and energy fluxes tensors at location x and time t. Recall definition of (1.2), only the momentum and energy fluxes are independent from the above conserved macroscopic quantities (defined in (1.1)-(1.3)).

For distribution in equilibrium (i.e., $f_i^{eq}(x,t)$ use in (1.5) and (1.6) instead), the equilibrium momentum and energy fluxes have well-known forms from the fundamental kinetic theory of (continuum) gases, respectively $$\Pi^{eq}(x,t) = \rho(x,t)u(x,t)u(x,t) + p(x,t)I \qquad (1.7)$$

$$Tr[Q^{eq}(x,t)] = \tfrac{1}{2}\rho(x,t)[(D+2)T(x,t)u(x,t) + u^2(x,t)u(x,t)] \qquad (1.8)$$

where p(x,t) is pressure, $p(x,t)=\rho(x,t)T(x,t)$ based on the ideal gas law, and "I" in (1.7) denotes a 2nd rank unity tensor. Tr[.] is a trace operation. A central theme in lattice Boltzmann methods is to recover the forms of (1.7) and (1.8).

Moments of (1.5) and (1.6) can also be expressed terms of equilibrium and non-equilibrium parts, $$\Pi(x,t) = \Pi^{eq}(x,t) + \Pi'^{neq}(x,t)$$
$$Q(x,t) = Q^{eq}(x,t) + Q'^{neq}(x,t)$$

Clearly, $$\Pi'^{neq}(x,t) = \sum_i c_i c_i f_i^{neq}(x,t) = \sum_i c_i c_i [f_i'(x,t) - f_i^{eq}(x,t)] \qquad (1.9)$$

$$Q'^{neq}(x,t) = \sum_i c_i c_i c_i f_i^{neq}(x,t) = \sum_i c_i c_i c_i [f_i'(x,t) - f_i^{eq}(x,t)] \qquad (1.10)$$

The non-equilibrium moment fluxes play a critical role in determining transport behavior in a fluid system. For instance, the non-equilibrium moment flux (1.9) directly determines the viscosity in a Newtonian fluid system, while that of (1.10) determines the heat diffusivity. Although there can be an infinite number of moments constructed out of particle distributions, only the ones given by (1.1)-(1.10) are macroscopically relevant in a physical fluid system.

The system denotes a degree of deviation from equilibrium as, $|f_i(x,t)-f_i^{eq}(x,t)|$, then a physically stable collision process always works in the direction of reducing the deviation. Namely, the post-collide deviation from equilibrium is smaller than that of pre-collide, $$|f_i'(x,t)-f_i^{eq}(x,t)| \le |f_i(x,t)-f_i^{eq}(x,t)| \qquad (1.11)$$

Collisions in a realistic many-particle system can be quite complicated. A a simplest collision model (operator) satisfies both the conservation law requirements and the convergence to equilibrium requirement of (1.11). A "BGK" collision process is mathematically expressed below, $$f_i'(x,t) = f_i^{eq}(x,t) + C_i(x,t) \qquad (1.12)$$

with the collision operator given by $$C_i(x,t) = \left(1 - \frac{1}{\tau}\right)(f_i(x,t) - f_i^{eq}(x,t)) \qquad (1.13)$$

Because all the three distribution functions give the same $\rho(x,t)$ and $u(x,t)$ (and $T(x,t)$ for energy conserved systems), the mass and momentum (and energy) conservations (i.e., (1.1)-(1.3)) are automatically satisfied. Furthermore, from (1.12), the deviation from equilibrium for the post-collide distribution is proportional to that of pre-collide by a factor $(1-1/\tau)$. Thus the convergence condition (1.11) is satisfied as long as the parameter value $\tau$ (referred to as the collision relaxation time) is greater than ½, and the post-collide deviation vanishes when $\tau=1$.

From the BGK relationship (1.12) and (1.13), equations (1.9) and (1.10) can be rewritten as, $$\prod'^{neq}(x,t) = \left(1 - \frac{1}{\tau}\right)\prod^{neq}(x,t) \qquad (1.14)$$

$$Q'^{neq}(x,t) = \left(1 - \frac{1}{\tau}\right)Q^{neq}(x,t) \qquad (1.15)$$

where $\Pi^{neq}(x,t)$ and $Q^{neq}(x,t)$ are, respectively, the pre-collide non-equilibrium momentum and energy fluxes defined below, $$\prod^{neq}(x,t) = \sum_i c_i c_i [f_i(x,t) - f_i^{eq}(x,t)] \qquad (1.16)$$

$$Q^{neq}(x,t) = \sum_i c_i c_i c_i [f_i(x,t) - f_i^{eq}(x,t)] \qquad (1.17)$$

Once the value of $\tau$ is chosen, the kinematic viscosity value in a lattice Boltzmann fluid with a BGK collision operator (1.12) is determined as, $$\nu = (\tau - 0.5)T_0 \qquad (1.18)$$

Here constant $T_0$ is the standard lattice temperature, and the so called lattice units convention is used so that the time increment in lattice units is unity. The BGK collision operator has been the most commonly used one in lattice Boltzmann models. It has been shown various levels of successes in the last twenty plus years. On the other hand, the BGK operator has some intrinsic limitations. Besides a unity Prandtl number (=ratio of viscosity and thermal diffusivity), one of the problems is, in addition to the fundamental ones of (1.9)-(1.10), all post-collide non-equilibrium moments are generated whenever tau is non-unity. Indeed for BGK, pre and post non-equilibrium moments exhibit the following relationship, $$M_n'(x,t) = \left(1 - \frac{1}{\tau}\right) * M_n(x,t) \qquad (1.19)$$

where $M_n'(x,t)$ and $M_n(x,t)$ represent, respectively, the post and pre collide of any n-th order moment.

F. The Filtered Collision Operator

The most generic feature of any lattice Boltzmann model is it has a finite and constant set of particle velocity vector values. For a given lattice Boltzmann model, a set of constant vector values is specified. As a consequence, only a finite set of moments of particle distribution functions constructed out of the discrete velocity set can recover of their counterparts in realistic fluids. A general framework for recovering moments of realistic fluids up to an arbitrarily given order is rigorously defined. Different set of lattice Boltzmann vector values may support physical moments up to different orders. For instance, the so called D3Q19 and D3Q15 only support moments up to equilibrium momentum flux and linear deviation (Newtonian) non-equilibrium momentum flux at low Mach number limit. On the other hand, the so called higher order lattice Boltzmann models such as D3Q39 can support moments up to equilibrium energy flux and non-equilibrium momentum flux beyond the linear deviation at finite Mach number and Knudsen number.

Since the only physically relevant moments are the equilibrium and non-equilibrium momentum and energy moments and their fluxes, for achieving correct physical fluid behavior and more numerical stability, it is desirable to design collision operators so that all the post-collide non-equilibrium moments vanish except for the non-equilibrium momentum flux (and possibly energy flux). Specifically non-equilibrium momentum flux energy flux represented in accordance with the below equations:

$$\prod'^{neq}(x, t) = \left(1 - \frac{1}{\tau}\right)\prod^{neq}(x, t) \qquad (2.1)$$

$$Q'^{neq}(x, t) = \left(1 - \frac{1}{\tau_e}\right)Q^{neq}(x, t) \qquad (2.2)$$

but the other post-collide non-equilibrium moments vanish, $$M_n'(x,t)=0. \qquad (2.3)$$

Recall (1.19) the BGK collision generates all non-equilibrium moments, a collision operator accomplishing (2.1)-(2.3) is also referred to as a filtered collision operator, because it filters out the non-essential non-equilibrium moments. While eliminating all the other non-equilibrium moments, the filtered collision operator retains the non-equilibrium momentum flux as (2.1). The explicit expression of this filtered collision operator is given below, $$C_i(x, t) = \left(1 - \frac{1}{\tau}\right)\frac{w_i}{2T_0^2}\left[\frac{c_i c_i}{T_0} - I\right]:\prod^{neq}(x, t) \qquad (2.4)$$

where constant $w_i$ is a weighting factor value determined once a particular lattice velocity set is chosen. A lattice velocity set is a discrete set of microscopic velocities or momentums in a space that is limited to a lattice. The set of weighting factor values is different for different lattice Boltzmann particle velocity set, and its purpose is to achieve moment isotropy to an expected order. Since the new (filtered) collision operator (2.4) results in the same post-collide non-equilibrium momentum flux (1.9) as BGK, it automatically gives rise to the same viscous effect in (1.18) as BGK.

For certain lattice systems, attaining a none vanishing non-equilibrium energy flux is also desirable, as shown in (2.2) having a non-unity $\tau_e$. A particular collision operator form that is shown to accomplish such a purpose is derived, $$C_i(x, t) = \left(1 - \frac{1}{\tau_e}\right)\frac{w_i}{6T_0^2}\left[\frac{c_i c_i c_i}{T_0} - 3c_i I\right]:Q^{neq}(x, t) \qquad (2.5)$$

Notice that the value $\tau_e$ may not need to be equal to $\tau$, so that the Prandtl number is not limited to unity as opposed to that in BGK. Due to moment orthogonality between momentum and energy fluxes, a more generalized filtered collision form is constructed by a direct sum of the two forms in (2.4) and (2.5), so that both non-equilibrium fluxes in (2.1) and (2.2) are automatically satisfied, while the rest of non-equilibrium moments vanish.

By filtering out unwanted non-equilibrium moments that are not supported by a given lattice velocity set, a generalized collision operator ((2.4), (2.5) or their combination) has demonstrated a significantly improved fluid flow isotropy than that of BGK, and yet it retains desired momentum and energy fluxes as that of BGK. It is important that the class of generalized collision operator forms (2.4) and (2.5) (and their combination) is not only applicable to the viscosity and thermal diffusivity of a Navier-Stokes fluid, it also ensures correct fluid dynamics in a wider fluid regime involving finite Knudsen numbers.

G. Procedure for Deriving N-th Order Galilean Invariant Filtered Operators

A system consistent with this disclosure generates a filtered collision operator with a specified exponent on the lattice Mach number, based on what amount of speeds are supportable by the simulation. This filtered collision operator uses relative values (e.g., of speed or energy) instead of absolute values (e.g., of speed or energy). Described herein is a procedure to appropriately construct the right theoretical form for a collision operator that does not include unwanted moments. The amount of non-equilibrium moments corresponds to the amount of speeds that are supportable by the simulation. So, the filtered collision operator represents non-equilibrium moments that are supported by the particle speed set of a given lattice Boltzmann model, so that the non-equilibrium moments correspond to what actually happens in a physical world. Use of the relative speed enables the construction of the filtered collision operator with wanted non-equilibrium contributions that are supported by the speed of the simulation.

That is, by determining non-equilibrium momentum and energy fluxes in terms of relative particle velocity and energy, respectively, a filtered collision operator can be constructed that filters out (e.g., excludes) higher order terms that are unsupported by a set of lattice speeds of a lattice Boltzmann model in the simulation. In an example, the collision operator is identified in extended form, so for a number of lattice velocities a user or a system has a way to know which terms up to which order should be preserved and terms that are beyond that order should be eliminated (from the collision operator). To do so, the extension (e.g., the collision operator) has to be expressed in terms of relative velocity.

In an example, a velocity model has a finite set of particle speeds. Accordingly, the true physical moments of particle movement can only be represented accurately in the model up to a certain order. In order to have a Galilean invariant collision operation and simulate speed at higher flow speed, the form of the collision operator is based on relative velocity, in which particle velocity is measured against its own flow velocity. For at least this reason, parameter $c_i'$ (representing relative velocity or energy) is used in the below equation 3.5, rather than using parameter $c_i$ in equation 3.5. The use of parameter $c_i$ in equation 3.5 does not allow for expansion of the collision form in the power of flow velocity (e.g., u(x,t)), and therefore does not provide for construction of an appropriate collision operation in accordance with Galilean invariance in terms of relative particle velocity to local flow velocity. However, the use of parameter $c_i'$ in equation 3.5 does allow for expansion of the collision form in the power (e.g., N-th order) of flow velocity (e.g., u(x,t)) and therefore provides for a N-th order Galilean invariant filtered operator.

In an example, a collision operator under the BGK model includes non-equilibrium moments of infinite order. The non-equilibrium moments up to a certain order become unphysical because certain velocity models cannot support moments correctly up to an infinite order. Accordingly, this system has to eliminate high order non-equilibrium moments, to prevent including physical artifacts. For example, the relative moments for a 19-speed model are only up to the first order. So, the higher order moments are irrelevant. But, when a study simulation is run with a BGK operator, the non-equilibrium moments beyond those supported by the model are included. Accordingly, the filtered collision operator described herein more closely corresponds to what happens in a physical world.

The above filtered collision forms are only for situations of flows at very small fluid velocity. From the basic principle of Galilean transformation invariance, all statistical properties of a physical fluid should only be a function of particle relative velocity to a mean flow velocity. Specifically, the particle non-equilibrium distribution function and the relevant non-equilibrium moments in a physical fluid system should only be dependent on the relative velocity ($c_i$−u(x,t)) as opposed to an absolute $c_i$ (measured in a zero flow reference frame in a lattice Boltzmann system). Thus, instead of (1.14) and (1.15), the more physically meaningful non-equilibrium momentum and energy fluxes are, respectively $$\prod{}^{neq}(x,t) = \sum_i c_i'(x,t)c_i'(x,t)[f_i(x,t) - f_i^{eq}(x,t)] \quad (3.1)$$

$$Q^{neq}(x,t) = \sum_i c_i'(x,t)c_i'(x,t)c_i'(x,t)[f_i(x,t) - f_i^{eq}(x,t)] \quad (3.2)$$

where the relative particle velocity and energy are given by, $$c_i'(x,t) = c_i - u(x,t) \quad (3.3)$$

As shown in the above equation 3.3, absolute particle velocity is replaced with relative velocity. Interestingly, due to mass and momentum conservation, the non-equilibrium momentum flux (3.1) turns out to be the same as (1.16). One the other hand, the non-equilibrium energy flux (3.2) cannot be reduced to (1.17).

A system consistent with this disclosure creates a Galilean invariant collision operator for non-equilibrium momentum flux. According to the fundamental physics of kinetic theory, the leading order non-equilibrium particle distribution due to fluid velocity inhomogeneity can be expressed as, $$f^{neq} \sim f^{eq} * \left[UU - \frac{1}{D}U^2 I\right] : \prod{}^{neq} \quad (3.4)$$

where U is the particle relative velocity to the local mean flow in continuum kinetic theory. Inspired by this concept, the system described herein identifies in lattice Boltzmann a similar expression for non-equilibrium distribution that is in accordance with Galilean invariance. The system identifies the explicit form below as the full corresponding non-equilibrium post-collide distribution function, $$C_i(x,t) = \left(1 - \frac{1}{\tau}\right)\frac{f_i^{eq}(x,t)}{2\rho(x,t)T_0}\left[\frac{c_i'(x,t)c_i'(x,t)}{T_0} - I\right] : \prod{}^{neq}(x,t) \quad (3.5)$$

where $\Pi^{neq}(x,t)$ is given by (1.14) or (3.1). As shown in the above equation 3.2, the distribution function includes both an equilibrium component and a non-equilibrium component. Additionally, the above equation requires a set of particle velocities to an infinite order.

The equilibrium distribution function in (3.5) is the full form for an arbitrary Mach number, $$f_i^{eq}(x,t) = w_i e^{(c_i^2/2T_0)} \rho(x,t) e^{[-c_i'(x,t)^2/2T_0]} \quad (3.6)$$

The full forms in (3.5) and (3.6) for, respectively, non-equilibrium and equilibrium distribution functions are only realizable if a lattice velocity set supports correct hydrodynamic moments to all orders. In other words, for any given lattice velocity set having a finite set of particle velocity values, the full forms are not achievable. However, these can be realized with a given finite lattice velocity set up to a corresponding order N, as described in detail below.

Expressions (3.5) and (3.6) can be expanded in polynomial forms in power of u(x,t). It is well known that the equilibrium distribution (3.6) is expressable in terms of a series of Hermite polynomials, $$f_i^{eq}(x,t) = w_i \rho(x,t) \sum_{n=0}^{\infty} \frac{H^{(n)}(\xi_i)}{n!} V(x,t)^{[n]} \quad (3.7)$$

here $V(x,t)^{[n]}$ is a short notation for direct product of vector V(x,t) n-number of times. $V(x,t) = u(x,t)/T_0^{1/2}$ and $\xi_i = c_i/T_0^{1/2}$. The n-th order Hermite polynomial $H^{(n)}(\xi_i)$ is a n-th rank tensor generalization of the standard (scalar) n-th order Hermite function. Without proof, the non-equilibrium contribution (3.5) can also be expressed in series of Hermite polynomials, $$C_i(x,t) = \left(1 - \frac{1}{\tau}\right)\frac{w_i}{2T_0} \sum_{n=2}^{\infty} \frac{H^{(n)}(\xi_i)}{n!} V(x,t)^{[n-2]} \prod{}^{neq}(x,t) \quad (3.8)$$

Using orthogonality properties of Hermite polynomials, the system obtains an N-th order approximation to these forms by simply truncate the two infinite series (3.7) and (3.8) retaining terms proportional to $u^m(x,t)$, for m≤N. One velocity model is the 19-speed cubic D3Q19 lattice connecting each lattice point to its first and second neighbors. Specifically, for the D3Q19 (or for D3Q15) type lattice velocity sets, the system expands $f_i^{eq}(x,t)$ in (3.6) up to $u^3(x,t)$, and $C_i(x,t)$ in (3.5) up to the first (linear) power of u(x,t):

$$C_i^{(1)}(x,t) = \left(1 - \frac{1}{\tau}\right)\frac{w_i}{2T_0}$$

$$\left[\left(1 + \frac{c_i \cdot u(x,t)}{T_0}\right)\left(\frac{c_i c_i}{T_0} - I\right) - \frac{c_i u(x,t) + u(x,t)c_i}{T_0}\right] : \prod{}^{neq}(x,t) \quad (3.9)$$

As shown in the above equation 3.9, this collision operation is accurate for a simulation system that can support nineteen speeds. Additionally, this collision operator is an extended form of $C_i(x,t)$ in (3.5) up to the first (linear) power, to correspond to what happens in the physical world for a simulation that can support nineteen speeds. This collision operator may be used in Equation 1.12 to modify the distribution function. In the above equation 3.9, x is the particular location within the volume, t is a particular point in time, i is an index number of lattice velocities in the set; $T_0$ is a constant lattice temperature; $c_i$ is a velocity vector of the particles prior to collision; $u(x,t)$ is mean velocity among the particles at particular location x at time t; I is a second rank unity tensor; $\tau$ is collision relation time; $w_i$ is a constant weighting factor; and $\Pi^{neq}$ is a non-equilibrium momentum flux.

Another velocity model is the D3Q39 lattice, which supports up to thirty-nine speeds. For D3Q39, the expansion can be carried out to $u(x,t)$ squared or cubic power. The truncation up to $u^2(x,t)$ is explicitly given below, $$C_i^{(2)}(x, t) = \qquad (3.10)$$
$$\left(1 - \frac{1}{\tau}\right)\frac{w_i}{2T_0}\left[\left(1 + \frac{c_i \cdot u(x,t)}{T_0} + \frac{(c_i \cdot u(x,t))^2}{2T_0^2} - \frac{u^2(x,t)}{2T_0}\right)\left(\frac{c_i c_i}{T_0} - I\right) - \right.$$
$$\left(1 + \frac{c_i \cdot u(x,t)}{T_0}\right)\frac{c_i u(x,t) + u(x,t)c_i}{T_0} +$$
$$\left. u(x,t)u(x,t)\right] : \prod{}^{neq}(x, t)$$

As shown in the above equation 3.10, the expanded form of the collision operator excludes unwanted moments, by not including in the expanded form higher order moments that are above the squared power- and thus not supported by the simulation. In this example, x is the particular location within the volume; t is a particular point in time; i is an index number of lattice velocities in the set; $T_0$ is a constant lattice temperature; $c_i$ is a velocity vector of the particles prior to collision; $u(x,t)$ is mean velocity among the particles at particular location x at time t; I is a second rank unity tensor; is collision relation time; $w_i$ is a constant weighting factor; and $\Pi_{neq}$ is a non-equilibrium momentum flux.

Therefore, the system reinterprets the collision form of (2.4) as the 0th order approximation (i.e., $C_i^{(0)}(x,t)$) of (3.5), for it only includes from (3.5) terms independent of $u(x,t)$. For higher order lattice velocity sets such as D3Q39, one can retain terms in equilibrium distribution function (3.6) up to $u^5(x,t)$, while retain in post-collide non-equilibrium distribution (3.5) up to $u^3(x,t)$. In general, this systematic procedure can be carried out to any arbitrary order (in power of $u(x,t)$) when a lattice velocity set provides an adequate corresponding order of support on hydrodynamic moments. Although at a given finite order the Galilean invariance is not exactly satisfied, the errors are moved towards higher and higher orders as higher and higher lattice velocity sets are used and higher and higher order expanded forms in (3.5) and (3.6) are used.

In the above, the system generates and executes a systematic procedure to construct generalized filtered collision operator for any given order in power of fluid velocity. In particular, for post-collide non-equilibrium flux, the first and second order corrections to the pre-existing filter operator (2.4) are explicit expressed in (3.9) and (3.10), respectively. A filtered collision operator filters out non-equilibrium moments except for those desired ones. Filter operators (2.4) and (3.9) (or (3.10)) both serve the purpose of retaining non-equilibrium momentum flux. On the other hand, though (3.9) (and (3.10)) gives the same non-equilibrium momentum flux (and viscosity value) as that of BGK and (2.4), this collision operator achieves improved numerical stability and Galilean invariance.

The same procedure can also be formulated for a filtered collision operator pertaining to energy flux. The generic fully Galilean invariant form is similar to that in (3.5), expressed in terms of relative velocity, $c_i'(x,t)$:

$$C_i(x, t) = \left(1 - \frac{1}{\tau_\varepsilon}\right) + \frac{f_i^{eq}(x, t)}{6T_0^3}[c_i'(x, t)c_i'(x, t)c_i'(x, t) - 3c_i'(x, t)T_0 I] : \qquad (3.11)$$
$$W^{neq}(x, t)$$

where $W^{neq}(x,t)$ is an appropriate linear combination of $Q^{neq}(x,t)$ and $u(x,t)\Pi^{neq}(x,t)$ of (3.1) and (3.2). According to the same procedure, one can systematically obtain any finite order form in power of $u(x,t)$ that is supported sufficiently by a given lattice velocity set. Due to moment orthogonality between momentum and energy fluxes, a general post-collide form is simply produced as an addition of (3.5) and (3.11) (in proper expended forms) that is able to realize desired viscosity and thermal diffusivity independently. In the above equation 3.11, x is the particular location within the volume; t is a particular point in time; i is an index number of lattice velocities in the set; $T_0$ is a constant lattice temperature; I is a second rank unity tensor; $\tau$ is collision relation time; $c_i'(x,t)$ is relative particle velocity; $f_i^{eq}$ is an equilibrium distribution function; and $W^{neq}$ is a non-equilibrium energy flux.

Figure 12:
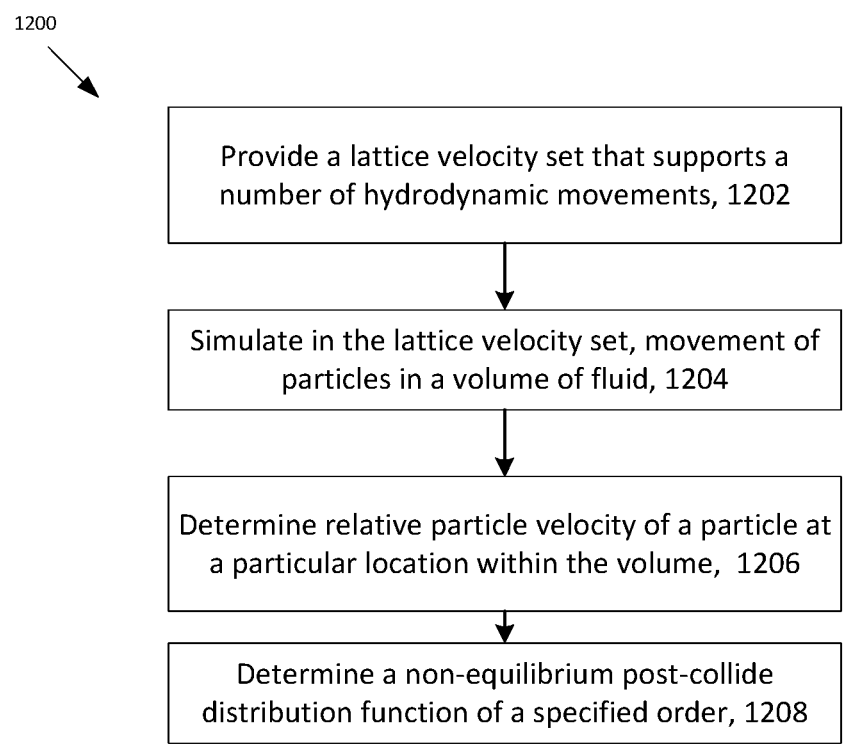
FIG. 12 is a flow chart of a process for determining a non-equilibrium post-collide distribution function of a specified order.

Referring to FIG. 12, a system consistent with this disclosure performs process 1200 in determining a non-equilibrium post-collide distribution function. In operation, the system provides (or otherwise obtains) (1202) a lattice velocity set that supports hydrodynamic moments up to a particular order of particle velocity. For example, the system obtains the D3Q19 model that supports 19 speeds of hydrodynamic moments movements up to a first order. In this example, the supported order (e.g., 19 speeds) for the lattice velocity set is less than and different from the specified order of the non-equilibrium post-collide distribution function (e.g., first order or linear), and the specified order for the non-equilibrium post-collide distribution function is determined by the order of the particle velocity. That is, for a velocity model that supports 19 speeds, the non-equilibrium post-collide distribution function is linear or only supported up to the first order (because 19 velocity speeds is associated with a first order flow velocity (i.e., $u(x,t)$). In this example, the system is configured to access (in a data repository or in another system) a supported order of the flow velocity for a particular velocity model (or for a particular number of velocity speeds). In this example, the system accesses a table or other mapping with this information.

In an example, the lattice velocity set is a set of state vectors associated with the Lattice Boltzmann Method. In this example, a state vector is a series of binary bits that is indicative of the behavior of collisions between particles at a lattice site. In another example, the lattice velocity set comprises a set of momentum states in a space that is limited to a lattice.

The system simulates (1204), in the lattice velocity set, movement of particles in a volume of fluid, with the movement causing collision among the particles. The simulation process was previously described. Based on the simulated movement, the system determines (1206) relative particle velocity of a particle at a particular location within the volume, with the relative particle velocity being a difference between (i) an absolute velocity of the particle at the particular location within the volume and measured under zero flow of the volume, and (ii) a mean velocity of one or more of the particles at the particular location within the volume. In an example, the relative particle velocity is the mean velocity of the one or more of the particles at the particular location within the volume subtracted from the absolute velocity of the particle at the particular location within the volume and measured under zero flow of the volume. In an example, the mean velocity of the one or more of the particles at the particular location within the volume comprises a mean velocity of a particular type of particles at the particular location. For example, a volume of fluid may include various, different types of particles. In this example, the system is configured to determine the mean velocity of at least a subset of the particles of a particular type. As previously described, the system determines the relative particle velocity based on the equation (3.3).

The system also determines (1208), based on the relative particle velocity, a non-equilibrium post-collide distribution function of a specified order that is representative of the collision. In an example, the non-equilibrium post-collide distribution function (i) retains non-equilibrium moments for predefined physical quantities, and (ii) eliminates non-equilibrium moments for undefined physical quantities, up to the specified order. In this example, the non-equilibrium post-collide distribution function retains non-equilibrium moments for predefined physical quantities by including terms that represent these predefined physical quantities in the expanded form of the non-equilibrium post-collide distribution function. The non-equilibrium post-collide distribution function eliminates non-equilibrium moments for undefined physical quantities, up to the specified order, by not including them in the expanded form, e.g., by truncating the infinite series shown in equations 3.7, 3.8 and retaining terms that are proportional to the specified order. In this example, the specified order is an exponential value associated with a ratio of the fluid velocity to lattice sound speed, wherein the lattice velocity set supports the exponential value.

Figure 13:
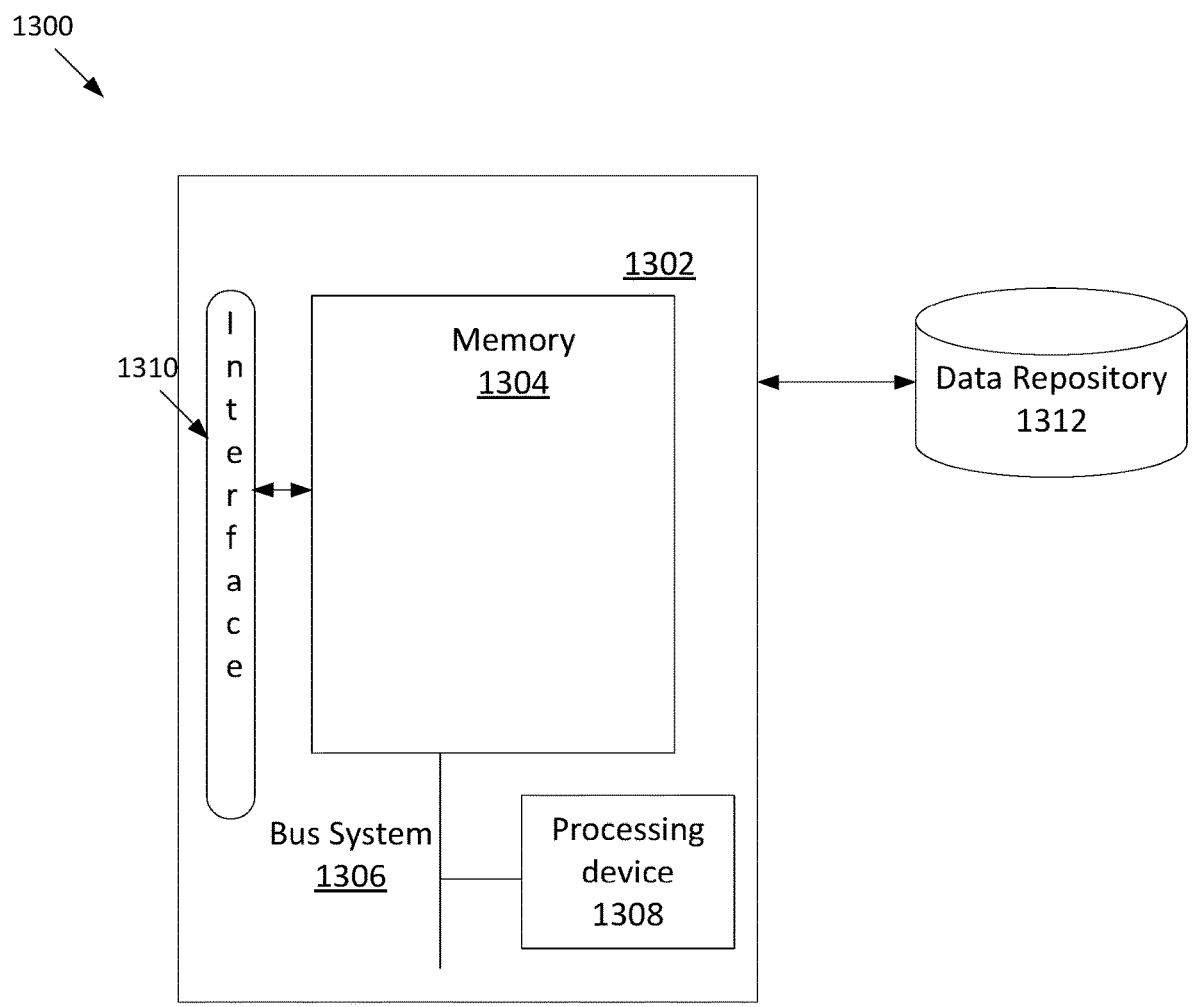
FIG. 13 is a block diagram of components of a system for determining a non-equilibrium post-collide distribution function of a specified order.

FIG. 13 is a block diagram of components of network environment 1300. Network environment 1300 also system 1302, which includes memory 1304, a bus system 1306, and a processor 1308. Memory 1304 can include a hard drive and a random access memory storage device, such as a dynamic random access memory, machine-readable hardware storage device, machine-readable media, or other types of non-transitory machine-readable storage devices. A bus system 1306, including, for example, a data bus and a motherboard, can be used to establish and to control data communication between the components of system 1302. Processor 1308 may include one or more microprocessors and/or processing devices. Generally, processor 1308 may include any appropriate processor and/or logic that is capable of receiving and storing data, and of communicating over a network (not shown).

System 1302 can be any of a variety of computing devices capable of receiving data, such as a server, a distributed computing system, a desktop computer, a laptop, a cell phone, a rack-mounted server, and so forth. System 1302 may be a single server or a group of servers that are at a same location or at different locations. The illustrated system 1302 can receive data via input/output ("I/O") interface 1310. I/O interface 1310 can be any type of interface capable of receiving data over a network, such as an Ethernet interface, a wireless networking interface, a fiber-optic networking interface, a modem, and so forth. System 1302 is configure for communication with data repository 1312, which may be configured to store velocity models, simulation data and so forth.

Using the techniques described herein, a system is described for generating a non-equilibrium post-collide distribution function, e.g., a Galilean invariant filtered operator. Using these techniques, various types of non-equilibrium post-collide distribution functions are generated, e.g., as shown in equations 3.5, 3.9, 3.10 and 3.11. The generated non-equilibrium post-collide distribution function is used in modeling a collision process of the particles in the volume of fluid, e.g., as shown in equation 1.12.

Embodiments can be implemented in digital electronic circuitry, or in computer hardware, firmware, software, or in combinations thereof. Apparatus of the techniques described herein can be implemented in a computer program product tangibly embodied or stored in a machine-readable media (e.g., hardware storage device) for execution by a programmable processor; and method actions can be performed by a programmable processor executing a program of instructions to perform operations of the techniques described herein by operating on input data and generating output. The techniques described herein can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

A number of implementations have been described. Nevertheless, it will be understood that various modifications may be made without departing from the spirit and scope of the claims. Accordingly, other implementations are within the scope of the following claims.

What is claimed is:

1. A method for simulating movement of particles in a volume of fluid by a computer using a lattice velocity set, with the movement causing collisions among the particles, the method comprising:

provid a lattice model having and a lattice velocity set that provides support for hydrodynamic moments;

receiving by one or more computer systems a model of a simulation space including a lattice structure represented as a collection of voxels, and a representation of a physical object, with the voxels having appropriate resolutions to account for surfaces of the physical object;

over a plurality of time increments, and for each time increment, simulating advection of particles from a first voxel to a subsequent voxel during the time increment; and simulating interaction of particles within each subsequent voxel during the time increment by applying a lattice post-collide distribution function that is defined in terms of a collision operator of a specified order Galilean invariance in terms of Mach number for the lattice velocity set.

2. The method of claim 1, wherein the lattice velocity set represents a starting pocket of fluid and a nearby pocket of fluid, and wherein the method further comprises:

determining an effect of the nearby pocket of fluid on the starting pocket of fluid.

3. The method of claim 1, wherein the lattice post-collide distribution function is a filtered collision operator, and wherein applying the filtered collision operator removes interactions representing non-equilibrium moments.

4. The method of claim 1, wherein the lattice post-collide distribution function is a filtered collision operator that is based on absolute values of speed or energy represented in the simulation.

5. The method of claim 1, wherein the lattice post-collide distribution function is a filtered collision operator that is configured to exclude higher order terms that are unsupported by the lattice velocity set.

6. The method of claim 1, wherein the provided support is first order support for hydrodynamic moments and wherein the specified order Galilean invariance is first order Galilean invariance.

7. The method of claim 1, wherein the provided support is second order support for hydrodynamic moments and wherein the specified order Galilean invariance is second order Galilean invariance.

8. The method of claim 1, wherein the lattice model is a lattice Boltzmann model.

9. One or more machine-readable hardware storage devices for simulating movement of particles in a volume of fluid by a computer using a lattice velocity set, with the movement causing collision among the particles, the one or more machine-readable hardware storage devices storing instructions that are executable by one or more processing devices to perform operations comprising:

providing a lattice model having a lattice velocity set that provides support for hydrodynamic moments;

receiving by one or more computer systems a model of a simulation space including a lattice structure represented as a collection of voxels, and a representation of a physical object, with the voxels having appropriate resolutions to account for surfaces of the physical object;

over a plurality of time increments, and for each time increment, simulating advection of particles from a first voxel to a subsequent voxel during the time increment; and simulating interaction of particles within each voxel during the time increment by applying a lattice post-collide distribution function that is defined in terms of a collision operator of a specified order Galilean invariance in terms of Mach number for the lattice velocity set.

10. The one or more machine-readable hardware storage devices of claim 9, wherein the lattice velocity set represents a starting pocket of fluid and a nearby pocket of fluid, and wherein the operations further comprise:

determining an effect of the nearby pocket of fluid on the starting pocket of fluid.

11. The one or more machine-readable hardware storage devices of claim 9, wherein the lattice post-collide distribution function is a filtered collision operator, and wherein the operations further comprise:

applying the filtered collision operator to remove interactions representing non-equilibrium moments.

12. The one or more machine-readable hardware storage devices of claim 9, wherein the lattice post-collide distribution function is a filtered collision operator that is based on absolute values of speed or energy represented in the simulation.

13. The one or more machine-readable hardware storage devices of claim 9, wherein the lattice post-collide distribution function is a filtered collision operator that is configured to exclude higher order terms that are unsupported by the lattice velocity set.

14. The one or more machine-readable hardware storage devices of claim 9, wherein the provided support is first order support for hydrodynamic moments and wherein the specified order Galilean invariance is first order Galilean invariance.

15. The one or more machine-readable hardware storage devices of claim 9, wherein the provided support is second order support for hydrodynamic moments and wherein the specified order Galilean invariance is second order Galilean invariance.

16. The one or more machine-readable hardware storage devices of claim 9, wherein the lattice model is a lattice Boltzmann model.

17. A data processing system for simulating movement of particles in a volume of fluid using a lattice velocity set, with the movement causing collision among the particles, the data processing system comprising one or more processing devices and one or more machine-readable hardware storage devices storing instructions that are executable by the one or more processing devices to perform operations comprising:

providing a lattice model having a lattice velocity set that provides support for hydrodynamic moments;

receiving by one or more computer systems a model of a simulation space including a lattice structure represented as a collection of voxels, and a representation of a physical object, with the voxels having appropriate resolutions to account for surfaces of the physical object;

over a plurality of time increments, and for each time increment, simulating advection of particles from a first voxel to a subsequent voxel during the time increment; and simulating interaction of particles within each voxel during the time increment by applying a lattice post-collide distribution function that is defined in terms of a collision operator of a specified order Galilean invariance in terms of Mach number for the lattice velocity set.

18. The data processing system of claim 17, wherein the lattice velocity set represents a starting pocket of fluid and a nearby pocket of fluid, and wherein the operations further comprise:

determining an effect of the nearby pocket of fluid on the starting pocket of fluid.

19. The data processing system of claim 17, wherein the lattice post-collide distribution function is a filtered collision operator, and wherein applying the filtered collision operator removes interactions representing non-equilibrium moments.

20. The data processing system of claim 17, wherein the lattice post-collide distribution function is a filtered collision operator that is based on absolute values of speed or energy represented in the simulation.

* * * * *